(12) United States Patent
Jang et al.

(10) Patent No.: US 12,707,039 B2
(45) Date of Patent: Aug. 11, 2026

(54) ADVANCED MOTION VECTOR PREDICTION (AMVP)-MERGE MODE-BASED IMAGE ENCODING/DECODING METHOD, DEVICE, AND RECORDING MEDIUM FOR STORING BITSTREAM

(71) Applicant: LG Electronics Inc., Seoul (KR)

(72) Inventors: Hyeong Moon Jang, Seoul (KR); Nae Ri Park, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 18/842,510

(22) PCT Filed: Apr. 12, 2023

(86) PCT No.: PCT/KR2023/004964
§ 371 (c)(1),
(2) Date: Aug. 29, 2024

(87) PCT Pub. No.: WO2023/200255
PCT Pub. Date: Oct. 19, 2023

(65) Prior Publication Data

US 2025/0184476 A1 Jun. 5, 2025

Related U.S. Application Data

(60) Provisional application No. 63/330,272, filed on Apr. 12, 2022.

(51) Int. Cl.
*H04N 19/105* (2014.01)
*H04N 19/176* (2014.01)
*H04N 19/70* (2014.01)

(52) U.S. Cl.
CPC ......... *H04N 19/105* (2014.11); *H04N 19/176* (2014.11); *H04N 19/70* (2014.11)

(58) Field of Classification Search
CPC .... H04N 19/105; H04N 19/176; H04N 19/70; H04N 19/109; H04N 19/132;
(Continued)

(56) References Cited

U.S. PATENT DOCUMENTS

2020/0413044 A1 12/2020 Zhang et al.
2022/0060688 A1* 2/2022 Galpin ................ H04N 19/463
(Continued)

FOREIGN PATENT DOCUMENTS

KR 10-2013-0061721 A 6/2013
KR 10-2014-0147102 A 12/2014
(Continued)

OTHER PUBLICATIONS

International Search Report and Written Opinion in International Appln. No. PCT/KR2023/004964, mailed on Jul. 3, 2023, 8 pages (with partial English translation).

*Primary Examiner* — Nasim N Nirjhar
(74) *Attorney, Agent, or Firm* — Fish & Richardson P.C.

(57) ABSTRACT

An image encoding/decoding method and apparatus are provided. The image decoding method may comprise selecting a first prediction candidate for a first prediction direction of a current block from a first prediction candidate list, selecting a second prediction candidate for a second prediction direction of the current block from a second prediction candidate list, and generating a prediction block for the current block based on the first prediction candidate and the second prediction candidate. The first prediction candidate may be an amvp candidate and the second prediction candidate may be a merge candidate.

12 Claims, 12 Drawing Sheets

(58) Field of Classification Search
CPC .... H04N 19/157; H04N 19/159; H04N 19/52; H04N 19/577; H04N 19/88
See application file for complete search history.

(56) References Cited

U.S. PATENT DOCUMENTS

2024/0380903 A1* 11/2024 Deng .................. H04N 19/176
2025/0220179 A1* 7/2025 Liu ..................... H04N 19/186

FOREIGN PATENT DOCUMENTS

KR 10-2019-0041480 A 4/2019
KR 10-2020-0093674 A 8/2020

* cited by examiner $MV_1$
$-MV_{diff}$
$MV_0$
$MV_1$
$MV_{diff}$
$MV_{0'}$
refPic in List L0
Current Picture
refPic in List L1

Figure 17:
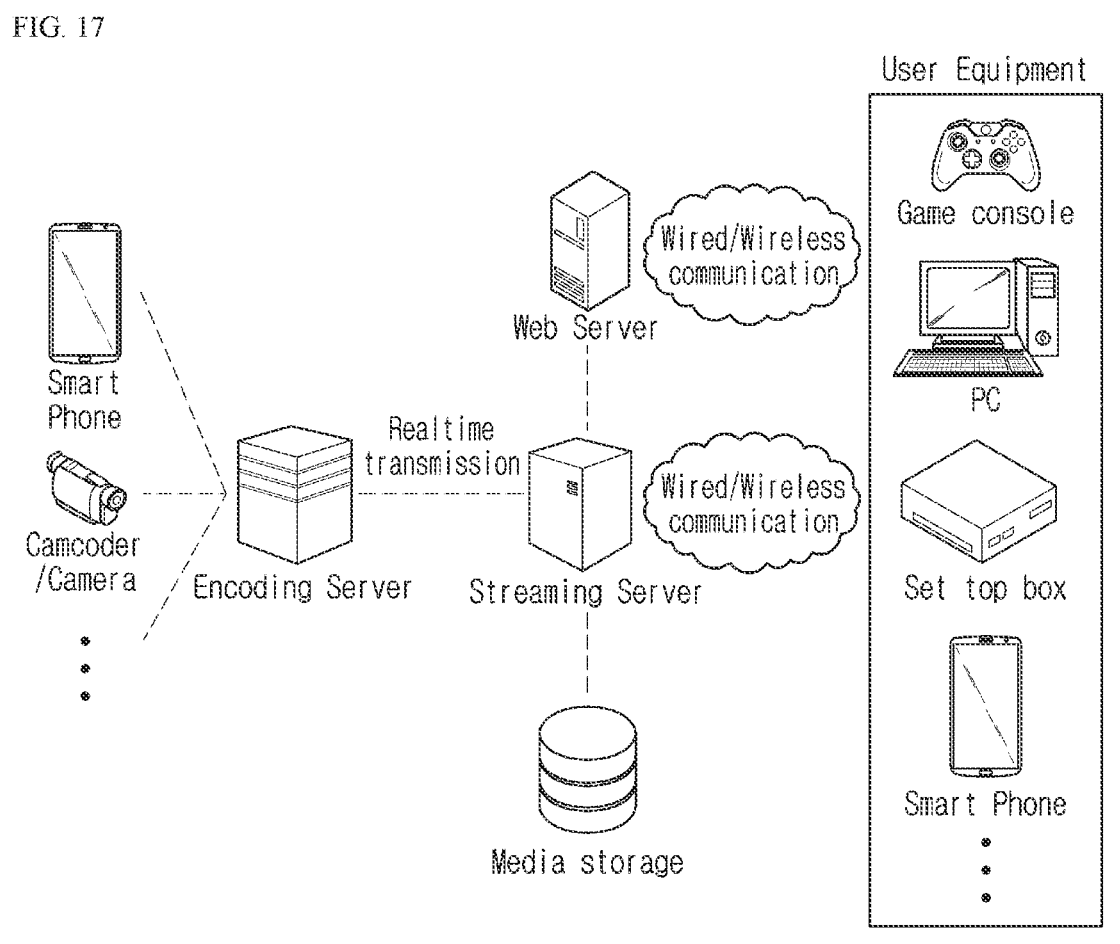

User Equipment
Game console
PC
Set top box
Smart Phone
Smart Phone
Camcoder /Camera
Encoding Server
Realtime transmission
Web Server
Streaming Server
Media storage
Wired/Wireless communication
Wired/Wireless communication

ADVANCED MOTION VECTOR PREDICTION (AMVP)-MERGE MODE-BASED IMAGE ENCODING/DECODING METHOD, DEVICE, AND RECORDING MEDIUM FOR STORING BITSTREAM

CROSS-REFERENCE TO RELATED APPLICATIONS

This application is a National Stage application under 35 U.S.C. § 371 of International Application No. PCT/KR2023/004964, filed on Apr. 12, 2023, which claims the benefit of U.S. Provisional Application No. 63/330,272, filed on Apr. 12, 2022. The disclosures of the prior applications are incorporated by reference in their entirety.

TECHNICAL FIELD

The present disclosure relates to an image encoding/decoding method and apparatus and a recording medium for storing a bitstream and, more particularly, to an image encoding and decoding method and apparatus based on an advanced motion vector prediction (AMVP)-merge mode, and a recording medium for storing bitstream generated by the image encoding method/apparatus of the present disclosure.

BACKGROUND ART

Recently, demand for high-resolution and high-quality images such as high definition (HD) images and ultra high definition (UHD) images is increasing in various fields. As resolution and quality of image data are improved, the amount of transmitted information or bits relatively increases as compared to existing image data. An increase in the amount of transmitted information or bits causes an increase in transmission cost and storage cost.

Accordingly, there is a need for high-efficient image compression technology for effectively transmitting, storing and reproducing information on high-resolution and high-quality images.

DISCLOSURE

Technical Problem

An object of the present disclosure is to provide an image encoding/decoding method and apparatus with improved encoding/decoding efficiency.

Another object of the present disclosure is to provide an image encoding/decoding method and apparatus that performs amvpMerge mode prediction.

Another object of the present disclosure is to provide an image encoding/decoding method and apparatus that adaptively performs a motion information refinement process based on whether DMVR (Decoder-side Motion Vector Refinement) is enabled when applying an amvpMerge mode.

Another object of the present disclosure is to provide an image encoding/decoding method and apparatus that adaptively performs a motion information reordering process based on whether DMVR is enabled when applying an amvpMerge mode.

Another object of the present disclosure is to provide an image encoding/decoding method and apparatus that refines construction of AMVP prediction candidates based on whether DMVR is enabled when applying an amvpMerge mode.

Another object of the present disclosure is to provide a non-transitory computer-readable recording medium for storing a bitstream generated by an image encoding method or apparatus according to the present disclosure.

Another object of the present disclosure is to provide a non-transitory computer-readable recording medium storing a bitstream received, decoded and used to reconstruct an image by an image decoding apparatus according to the present disclosure.

Another object of the present disclosure is to provide a method of transmitting a bitstream generated by an image encoding method or apparatus according to the present disclosure.

The technical problems solved by the present disclosure are not limited to the above technical problems and other technical problems which are not described herein will become apparent to those skilled in the art from the following description.

Technical Solution

According to an embodiment of the present disclosure, an image decoding method performed by an image decoding apparatus may comprise selecting a first prediction candidate for a first prediction direction of a current block from a first prediction candidate list, selecting a second prediction candidate for a second prediction direction of the current block from a second prediction candidate list, and generating a prediction block for the current block based on the first prediction candidate and the second prediction candidate. The first prediction candidate may be an amvp candidate and the second prediction candidate may be a merge candidate.

According to an embodiment of the present disclosure, the image decoding method may comprise obtaining decoder-side motion vector refinement (DMVR) enabled information indicating whether DMVR is enabled and adaptively performing refinement of the first prediction candidate and the second prediction candidate based on the DMVR enabled information.

According to an embodiment of the present disclosure, motion information refinement may be skipped for the first prediction candidate and the second prediction candidate based on the DMVR enabled information indicating that DMVR is not enabled, and the generating the prediction block for the current block may be performed based on the first prediction candidate and the second prediction candidate for which the motion information refinement has not been performed.

According to an embodiment of the present disclosure, motion information refinement may be performed for the first prediction candidate and the second prediction candidate based on the DMVR enabled information indicating that DMVR is enabled, and the generating the prediction block for the current block may be performed based on the first prediction candidate and the second prediction candidate for which the motion information refinement has been performed.

According to an embodiment of the present disclosure, the selecting the second prediction candidate may comprise adaptively performing reordering of the second prediction candidate based on reordering enabled information indicating whether reordering of the second prediction candidate included in the second prediction candidate list is enabled.

According to an embodiment of the present disclosure, reordering of the second prediction candidate included in the second prediction candidate list may be skipped based on the reordering enabled information indicating that reordering is not enabled, and selection of the second prediction candidate may be performed based on the second prediction candidate list for which reordering has not been performed.

According to an embodiment of the present disclosure, reordering of the second prediction candidate included in the second prediction candidate list may be performed based on the reordering enabled information indicating that reordering is enabled, and selection of the second prediction candidate may be performed based on the second prediction candidate list for which reordering has been performed.

According to an embodiment of the present disclosure, the reordering may be performed based on a bilateral matching cost between the first prediction candidate and the second prediction candidate.

According to an embodiment of the present disclosure, construction of the first prediction candidate list or derivation of first prediction motion information of the current block based on the first prediction candidate may be adaptively performed based on whether DMVR is enabled.

According to an embodiment of the present disclosure, the first prediction candidate list may include N first prediction candidates based on the DMVR being not enabled, and the first prediction motion information of the current block may be derived based on the first prediction candidate and a motion vector difference value obtained from a bitstream, and the motion vector difference value may be signaled for each of the N first prediction candidates, where N is a natural number greater than or equal to 1.

According to an embodiment of the present disclosure, an image encoding method performed by an image encoding apparatus may comprise determining a first prediction candidate for a first prediction direction of a current block from a first prediction candidate list, determining a second prediction candidate for a second prediction direction of the current block from a second prediction candidate list, and generating a prediction block for the current block based on the first prediction candidate and the second prediction candidate. The first prediction candidate may be an amvp candidate and the second prediction candidate may be a merge candidate.

According to an embodiment of the present disclosure, in a method of transmitting a bitstream generated by an image encoding method, the image encoding method may comprise determining a first prediction candidate for a first prediction direction of a current block from a first prediction candidate list, determining a second prediction candidate for a second prediction direction of the current block from a second prediction candidate list, and generating a prediction block for the current block based on the first prediction candidate and the second prediction candidate. The first prediction candidate may be an amvp candidate and the second prediction candidate may be a merge candidate.

Advantageous Effects

According to the present disclosure, it is possible to provide an image encoding/decoding method and apparatus with improved encoding/decoding efficiency.

Also, according to the present disclosure, it is possible to provide an image encoding/decoding method and apparatus that performs amvpMerge mode prediction.

Also, according to the present disclosure, it is possible to provide an image encoding/decoding method and apparatus that adaptively performs a motion information refinement process based on whether DMVR (Decoder-side Motion Vector Refinement) is enabled when applying an amvp-Merge mode.

Also, according to the present disclosure, it is possible to provide an image encoding/decoding method and apparatus that adaptively performs a motion information reordering process based on whether DMVR is enabled when applying an amvpMerge mode.

Also, according to the present disclosure, it is possible to provide an image encoding/decoding method and apparatus that refines construction of AMVP prediction candidates based on whether DMVR is enabled when applying an amvpMerge mode.

Also, according to the present disclosure, it is possible to provide a non-transitory computer-readable recording medium for storing a bitstream generated by an image encoding method or apparatus according to the present disclosure.

Also, according to the present disclosure, it is possible to provide a non-transitory computer-readable recording medium storing a bitstream received, decoded and used to reconstruct an image by an image decoding apparatus according to the present disclosure.

Also, according to the present disclosure, it is possible to provide a method of transmitting a bitstream generated by an image encoding method or apparatus according to the present disclosure.

It will be appreciated by persons skilled in the art that that the effects that can be achieved through the present disclosure are not limited to what has been particularly described hereinabove and other advantages of the present disclosure will be more clearly understood from the detailed description.

DESCRIPTION OF DRAWINGS

FIG. 15 is a flowchart illustrating a process for deriving a merge candidate list in an amvpMerge mode according to an embodiment of the present disclosure.

FIG. 17 is a view illustrating a content streaming system, to which an embodiment of the present disclosure is applicable.

MODE FOR INVENTION

Figure 1:
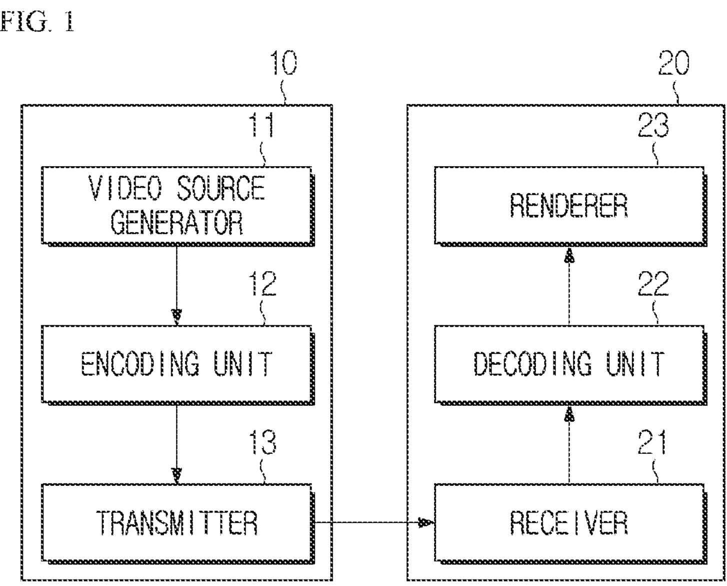
FIG. 1 is a view schematically illustrating a video coding system, to which an embodiment of the present disclosure is applicable

Hereinafter, the embodiments of the present disclosure will be described in detail with reference to the accompanying drawings so as to be easily implemented by those skilled in the art. However, the present disclosure may be implemented in various different forms, and is not limited to the embodiments described herein.

In describing the present disclosure, if it is determined that the detailed description of a related known function or construction renders the scope of the present disclosure unnecessarily ambiguous, the detailed description thereof will be omitted. In the drawings, parts not related to the description of the present disclosure are omitted, and similar reference numerals are attached to similar parts.

In the present disclosure, when a component is "connected", "coupled" or "linked" to another component, it may include not only a direct connection relationship but also an indirect connection relationship in which an intervening component is present. In addition, when a component "includes" or "has" other components, it means that other components may be further included, rather than excluding other components unless otherwise stated.

In the present disclosure, the terms first, second, etc. may be used only for the purpose of distinguishing one component from other components, and do not limit the order or importance of the components unless otherwise stated. Accordingly, within the scope of the present disclosure, a first component in one embodiment may be referred to as a second component in another embodiment, and similarly, a second component in one embodiment may be referred to as a first component in another embodiment.

In the present disclosure, components that are distinguished from each other are intended to clearly describe each feature, and do not mean that the components are necessarily separated. That is, a plurality of components may be integrated and implemented in one hardware or software unit, or one component may be distributed and implemented in a plurality of hardware or software units. Therefore, even if not stated otherwise, such embodiments in which the components are integrated or the component is distributed are also included in the scope of the present disclosure.

In the present disclosure, the components described in various embodiments do not necessarily mean essential components, and some components may be optional components. Accordingly, an embodiment consisting of a subset of components described in an embodiment is also included in the scope of the present disclosure. In addition, embodiments including other components in addition to components described in the various embodiments are included in the scope of the present disclosure.

The present disclosure relates to encoding and decoding of an image, and terms used in the present disclosure may have a general meaning commonly used in the technical field, to which the present disclosure belongs, unless newly defined in the present disclosure.

In the present disclosure, a "video" may mean a set of images over time.

In the present disclosure, a "picture" generally refers to a unit representing one image in a specific time period, and a slice/tile is a coding unit constituting a part of a picture, and one picture may be composed of one or more slices/tiles. In addition, a slice/tile may include one or more coding tree units (CTUs).

In the present disclosure, a "pixel" or a "pel" may mean a smallest unit constituting one picture (or image). In addition, "sample" may be used as a term corresponding to a pixel. A sample may generally represent a pixel or a value of a pixel, and may represent only a pixel/pixel value of a luma component or only a pixel/pixel value of a chroma component.

In the present disclosure, a "unit" may represent a basic unit of image processing. The unit may include at least one of a specific region of the picture and information related to the region. The unit may be used interchangeably with terms such as "sample array", "block" or "area" in some cases. In a general case, an M×N block may include samples (or sample arrays) or a set (or array) of transform coefficients of M columns and N rows.

In the present disclosure, "current block" may mean one of "current coding block", "current coding unit", "coding target block", "decoding target block" or "processing target block". When prediction is performed, "current block" may mean "current prediction block" or "prediction target block". When transform (inverse transform)/quantization (dequantization) is performed, "current block" may mean "current transform block" or "transform target block". When filtering is performed, "current block" may mean "filtering target block".

In addition, in the present disclosure, a "current block" may mean a block including both a luma component block and a chroma component block or "a luma block of a current block" unless explicitly stated as a chroma block. The luma component block of the current block may be expressed by including an explicit description of a luma component block such as "luma block" or "current luma block. In addition, the "chroma component block of the current block" may be expressed by including an explicit description of a chroma component block, such as "chroma block" or "current chroma block".

In the present disclosure, the term "/" and "," should be interpreted to indicate "and/or." For instance, the expression "A/B" and "A, B" may mean "A and/or B." Further, "A/B/C" and "A/B/C" may mean "at least one of A, B, and/or C."

In the present disclosure, the term "or" should be interpreted to indicate "and/or." For instance, the expression "A or B" may comprise 1) only "A", 2) only "B", and/or 3) both "A and B". In other words, in the present disclosure, the term "or" should be interpreted to indicate "additionally or alternatively."

In the present disclosure, "at least one of A, B, and C" may mean "only A," "only B," "only C," or "any and all combinations of A, B, and C." In addition, "at least one A, B or C" or "at least one A, B and/or C" may mean "at least one A, B and C."

Parentheses used in the present disclosure may mean "for example." For example, if "prediction (intra prediction)" is indicated, "intra prediction" may be proposed as an example of "prediction." In other words, "prediction" in the present disclosure is not limited to "intra prediction," and "intra prediction" may be proposed as an example of "prediction." In addition, even when "prediction (i.e., intra prediction)" is indicated, "intra prediction" may be proposed as an example of "prediction."

Overview of Video Coding System

FIG. 1 is a view showing a video coding system to which an embodiment of the present disclosure is applicable.

The video coding system according to an embodiment may include an encoding apparatus 10 and a decoding apparatus 20. The encoding apparatus 10 may deliver encoded video and/or image information or data to the decoding apparatus 20 in the form of a file or streaming via a digital storage medium or network.

The encoding apparatus 10 according to an embodiment may include a video source generator 11, an encoding unit (encoder) 12 and a transmitter 13. The decoding apparatus 20 according to an embodiment may include a receiver 21, a decoding unit (decoder) 22 and a renderer 23. The encoding unit 12 may be called a video/image encoding apparatus, and the decoding unit 22 may be called a video/image decoding apparatus. The transmitter 13 may be included in the encoding unit 12. The receiver 21 may be included in the decoding unit 22. The renderer 23 may include a display and the display may be configured as a separate device or an external component.

The video source generator 11 may acquire a video/image through a process of capturing, synthesizing or generating the video/image. The video source generator 11 may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding unit 12 may encode an input video/image. The encoding unit 12 may perform a series of procedures such as prediction, transform, and quantization for compression and coding efficiency. The encoding unit 12 may output encoded data (encoded video/image information) in the form of a bitstream.

The transmitter 13 may obtain the encoded video/image information or data output in the form of a bitstream and forward it to the receiver 21 of the decoding apparatus 20 or another external object through a digital storage medium or a network in the form of a file or streaming. The digital storage medium may include various storage mediums such as USB, SD, CD, DVD, Blu-ray, HDD, SSD, and the like. The transmitter 13 may include an element for generating a media file through a predetermined file format and may include an element for transmission through a broadcast/communication network. The transmitter 13 may be provided as a transmission device separate from the encoding apparatus 120, and in this case, the transmission device may include at least one processor that acquires encoded video/image information or data output in the form of a bitstream and a transmission unit for transmitting it in the form of a file or streaming. The receiver 21 may extract/receive the bitstream from the storage medium or network and transmit the bitstream to the decoding unit 22.

The decoding unit 22 may decode the video/image by performing a series of procedures such as dequantization, inverse transform, and prediction corresponding to the operation of the encoding unit 12.

The renderer 23 may render the decoded video/image. The rendered video/image may be displayed through the display.

Overview of Image Encoding Apparatus

Figure 2:
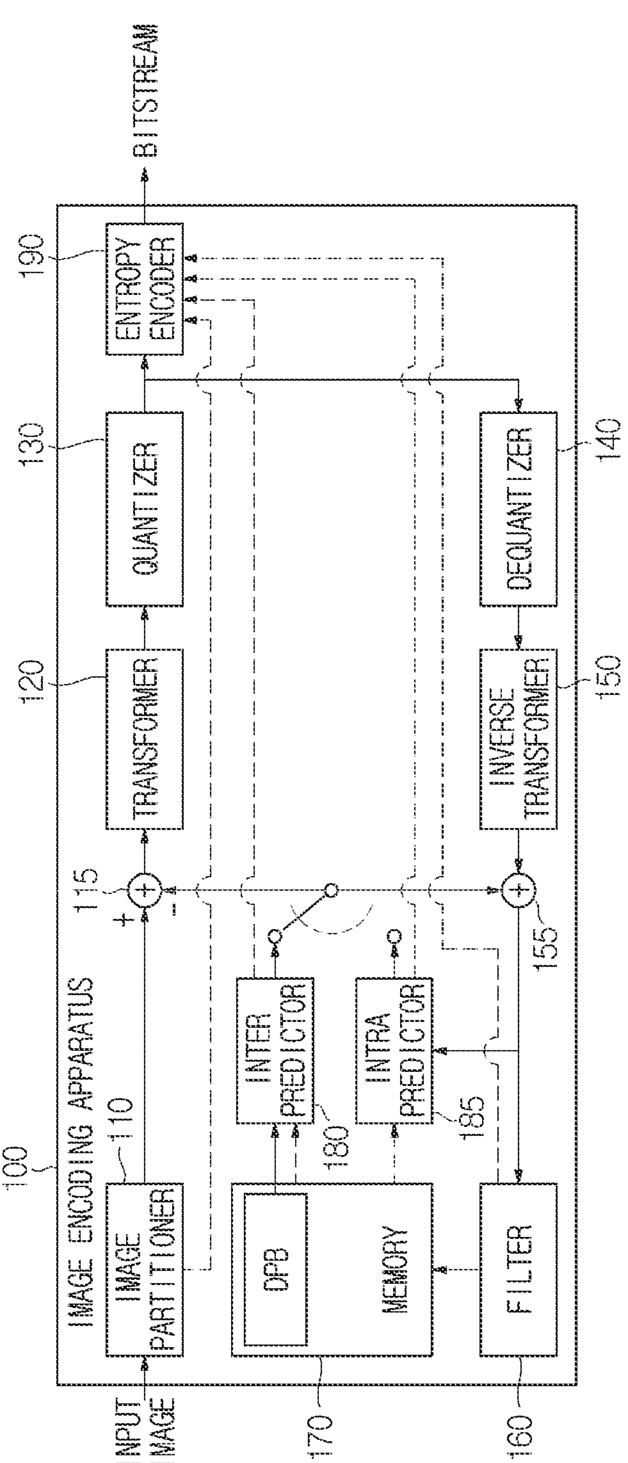
FIG. 2 is a view schematically illustrating an image encoding apparatus, to which an embodiment of the present disclosure is applicable.

FIG. 2 is a view schematically showing an image encoding apparatus, to which an embodiment of the present disclosure is applicable.

As shown in FIG. 2, the image encoding apparatus 100 may include an image partitioner 110, a subtractor 115, a transformer 120, a quantizer 130, a dequantizer 140, an inverse transformer 150, an adder 155, a filter 160, a memory 170, an inter prediction unit 180, an intra prediction unit 185 and an entropy encoder 190. The inter prediction unit 180 and the intra prediction unit 185 may be collectively referred to as a "prediction unit". The transformer 120, the quantizer 130, the dequantizer 140 and the inverse transformer 150 may be included in a residual processor. The residual processor may further include the subtractor 115.

All or at least some of the plurality of components configuring the image encoding apparatus 100 may be configured by one hardware component (e.g., an encoder or a processor) in some embodiments. In addition, the memory 170 may include a decoded picture buffer (DPB) and may be configured by a digital storage medium.

The image partitioner 110 may partition an input image (or a picture or a frame) input to the image encoding apparatus 100 into one or more processing units. For example, the processing unit may be called a coding unit (CU). The coding unit may be acquired by recursively partitioning a coding tree unit (CTU) or a largest coding unit (LCU) according to a quad-tree binary-tree ternary-tree (QT/BT/TT) structure. For example, one coding unit may be partitioned into a plurality of coding units of a deeper depth based on a quad tree structure, a binary tree structure, and/or a ternary structure. For partitioning of the coding unit, a quad tree structure may be applied first and the binary tree structure and/or ternary structure may be applied later. The coding procedure according to the present disclosure may be performed based on the final coding unit that is no longer partitioned. The largest coding unit may be used as the final coding unit or the coding unit of deeper depth acquired by partitioning the largest coding unit may be used as the final coding unit. Here, the coding procedure may include a procedure of prediction, transform, and reconstruction, which will be described later. As another example, the processing unit of the coding procedure may be a prediction unit (PU) or a transform unit (TU). The prediction unit and the transform unit may be split or partitioned from the final coding unit. The prediction unit may be a unit of sample prediction, and the transform unit may be a unit for deriving a transform coefficient and/or a unit for deriving a residual signal from the transform coefficient.

The prediction unit (the inter prediction unit 180 or the intra prediction unit 185) may perform prediction on a block to be processed (current block) and generate a predicted block including prediction samples for the current block. The prediction unit may determine whether intra prediction or inter prediction is applied on a current block or CU basis. The prediction unit may generate various information related to prediction of the current block and transmit the generated information to the entropy encoder 190. The information on the prediction may be encoded in the entropy encoder 190 and output in the form of a bitstream.

The intra prediction unit (intra predictor) 185 may predict the current block by referring to the samples in the current picture. The referred samples may be located in the neighborhood of the current block or may be located apart according to the intra prediction mode and/or the intra prediction technique. The intra prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra prediction unit 185 may determine the prediction mode applied to the current block by using a prediction mode applied to a neighboring block.

The inter prediction unit (inter predictor) 180 may derive a predicted block for the current block based on a reference block (reference sample array) specified by a motion vector on a reference picture. In this case, in order to reduce the amount of motion information transmitted in the inter prediction mode, the motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like. The reference picture including the temporal neighboring block may be called a collocated picture (colPic). For example, the inter prediction unit 180 may construct a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter prediction unit 180 may use motion information of the neighboring block as motion information of the current block. In the case of the skip mode, unlike the merge mode, the residual signal may not be transmitted. In the case of the motion vector prediction (MVP) mode, the motion vector of the neighboring block may be used as a motion vector predictor, and the motion vector of the current block may be signaled by encoding a motion vector difference and an indicator for a motion vector predictor. The motion vector difference may mean a difference between the motion vector of the current block and the motion vector predictor.

The prediction unit may generate a prediction signal based on various prediction methods and prediction techniques described below. For example, the prediction unit may not only apply intra prediction or inter prediction but also simultaneously apply both intra prediction and inter prediction, in order to predict the current block. A prediction method of simultaneously applying both intra prediction and inter prediction for prediction of the current block may be called combined inter and intra prediction (CHIP). In addition, the prediction unit may perform intra block copy (IBC) for prediction of the current block. Intra block copy may be used for content image/video coding of a game or the like, for example, screen content coding (SCC). IBC is a method of predicting a current picture using a previously reconstructed reference block in the current picture at a location apart from the current block by a predetermined distance. When IBC is applied, the location of the reference block in the current picture may be encoded as a vector (block vector) corresponding to the predetermined distance. IBC basically performs prediction in the current picture, but may be performed similarly to inter prediction in that a reference block is derived within the current picture. That is, IBC may use at least one of the inter prediction techniques described in the present disclosure.

The prediction signal generated by the prediction unit may be used to generate a reconstructed signal or to generate a residual signal. The subtractor 115 may generate a residual signal (residual block or residual sample array) by subtracting the prediction signal (predicted block or prediction sample array) output from the prediction unit from the input image signal (original block or original sample array). The generated residual signal may be transmitted to the transformer 120.

The transformer 120 may generate transform coefficients by applying a transform technique to the residual signal. For example, the transform technique may include at least one of a discrete cosine transform (DCT), a discrete sine transform (DST), a karhunen-loève transform (KLT), a graph-based transform (GBT), or a conditionally non-linear transform (CNT). Here, the GBT means transform obtained from a graph when relationship information between pixels is represented by the graph. The CNT refers to transform acquired based on a prediction signal generated using all previously reconstructed pixels. In addition, the transform process may be applied to square pixel blocks having the same size or may be applied to blocks having a variable size rather than square.

The quantizer 130 may quantize the transform coefficients and transmit them to the entropy encoder 190. The entropy encoder 190 may encode the quantized signal (information on the quantized transform coefficients) and output a bitstream. The information on the quantized transform coefficients may be referred to as residual information. The quantizer 130 may rearrange quantized transform coefficients in a block type into a one-dimensional vector form based on a coefficient scanning order and generate information on the quantized transform coefficients based on the quantized transform coefficients in the one-dimensional vector form.

The entropy encoder 190 may perform various encoding methods such as, for example, exponential Golomb, context-adaptive variable length coding (CAVLC), context-adaptive binary arithmetic coding (CABAC), and the like. The entropy encoder 190 may encode information necessary for video/image reconstruction other than quantized transform coefficients (e.g., values of syntax elements, etc.) together or separately. Encoded information (e.g., encoded video/image information) may be transmitted or stored in units of network abstraction layers (NALs) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. The signaled information, transmitted information and/or syntax elements described in the present disclosure may be encoded through the above-described encoding procedure and included in the bitstream.

The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 190 and/or a storage unit (not shown) storing the signal may be included as internal/external element of the image encoding apparatus 100. Alternatively, the transmitter may be provided as the component of the entropy encoder 190.

The quantized transform coefficients output from the quantizer 130 may be used to generate a residual signal. For example, the residual signal (residual block or residual samples) may be reconstructed by applying dequantization and inverse transform to the quantized transform coefficients through the dequantizer 140 and the inverse transformer 150.

The adder 155 adds the reconstructed residual signal to the prediction signal output from the inter prediction unit 180 or the intra prediction unit 185 to generate a reconstructed signal (reconstructed picture, reconstructed block, reconstructed sample array). If there is no residual for the block to be processed, such as a case where the skip mode is applied, the predicted block may be used as the reconstructed block. The adder 155 may be called a reconstructor or a reconstructed block generator. The generated reconstructed signal may be used for intra prediction of a next block to be processed in the current picture and may be used for inter prediction of a next picture through filtering as described below.

Meanwhile, luma mapping with chroma scaling (LMCS) is applicable in a picture encoding and/or reconstruction process.

The filter 160 may improve subjective/objective image quality by applying filtering to the reconstructed signal. For example, the filter 160 may generate a modified reconstructed picture by applying various filtering methods to the reconstructed picture and store the modified reconstructed picture in the memory 170, specifically, a DPB of the memory 170. The various filtering methods may include, for example, deblocking filtering, a sample adaptive offset, an adaptive loop filter, a bilateral filter, and the like. The filter 160 may generate various information related to filtering and transmit the generated information to the entropy encoder 190 as described later in the description of each filtering method. The information related to filtering may be encoded by the entropy encoder 190 and output in the form of a bitstream.

The modified reconstructed picture transmitted to the memory 170 may be used as the reference picture in the inter prediction unit 180. When inter prediction is applied through the image encoding apparatus 100, prediction mismatch between the image encoding apparatus 100 and the image decoding apparatus may be avoided and encoding efficiency may be improved.

The DPB of the memory 170 may store the modified reconstructed picture for use as a reference picture in the inter prediction unit 180. The memory 170 may store the motion information of the block from which the motion information in the current picture is derived (or encoded) and/or the motion information of the blocks in the picture that have already been reconstructed. The stored motion information may be transmitted to the inter prediction unit 180 and used as the motion information of the spatial neighboring block or the motion information of the temporal neighboring block. The memory 170 may store reconstructed samples of reconstructed blocks in the current picture and may transfer the reconstructed samples to the intra prediction unit 185.

Overview of Image Decoding Apparatus

Figure 3:
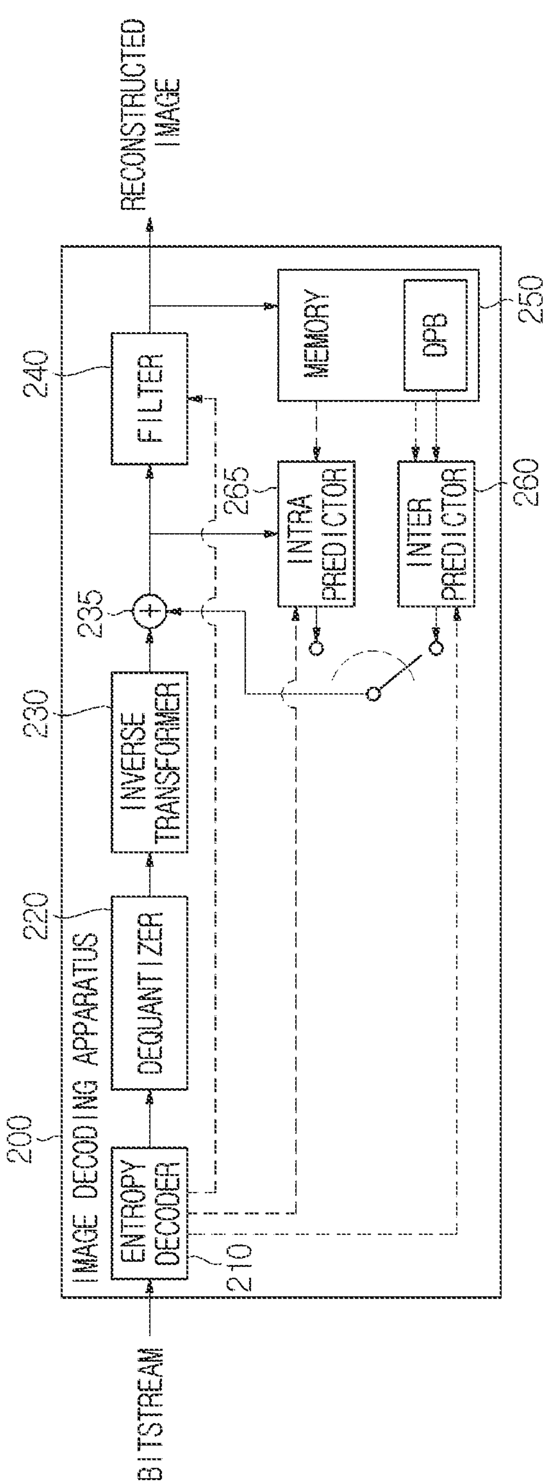
FIG. 3 is a view schematically illustrating an image decoding apparatus, to which an embodiment of the present disclosure is applicable.

FIG. 3 is a view schematically showing an image decoding apparatus, to which an embodiment of the present disclosure is applicable.

As shown in FIG. 3, the image decoding apparatus 200 may include an entropy decoder 210, a dequantizer 220, an inverse transformer 230, an adder 235, a filter 240, a memory 250, an inter predictor 260 and an intra prediction unit 265. The inter predictor (inter prediction unit) 260 and the intra predictor (intra prediction unit) 265 may be collectively referred to as a "prediction unit (predictor)". The dequantizer 220 and the inverse transformer 230 may be included in a residual processor.

All or at least some of a plurality of components configuring the image decoding apparatus 200 may be configured by a hardware component (e.g., a decoder or a processor) according to an embodiment. In addition, the memory 170 may include a decoded picture buffer (DPB) or may be configured by a digital storage medium.

The image decoding apparatus 200, which has received a bitstream including video/image information, may reconstruct an image by performing a process corresponding to a process performed by the image encoding apparatus 100 of FIG. 2. For example, the image decoding apparatus 200 may perform decoding using a processing unit applied in the image encoding apparatus. Thus, the processing unit of decoding may be a coding unit, for example. The coding unit may be acquired by partitioning a coding tree unit or a largest coding unit. The reconstructed image signal decoded and output through the image decoding apparatus 200 may be reproduced through a reproducing apparatus (not shown).

The image decoding apparatus 200 may receive a signal output from the image encoding apparatus of FIG. 2 in the form of a bitstream. The received signal may be decoded through the entropy decoder 210. For example, the entropy decoder 210 may parse the bitstream to derive information (e.g., video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The image decoding apparatus may further decode picture based on the information on the parameter set and/or the general constraint information. Signaled/received information and/or syntax elements described in the present disclosure may be decoded through the decoding procedure and obtained from the bitstream. For example, the entropy decoder 210 decodes the information in the bitstream based on a coding method such as exponential Golomb coding, CAVLC, or CABAC, and output values of syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a neighboring block and a decoding target block or information of a symbol/bin decoded in a previous stage, and perform arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 210 may be provided to the prediction unit (the inter predictor 260 and the intra prediction unit 265), and the residual value on which the entropy decoding was performed in the entropy decoder 210, that is, the quantized transform coefficients and related parameter information, may be input to the dequantizer 220. In addition, information on filtering among information decoded by the entropy decoder 210 may be provided to the filter 240. Meanwhile, a receiver (not shown) for receiving a signal output from the image encoding apparatus may be further configured as an internal/external element of the image decoding apparatus 200, or the receiver may be a component of the entropy decoder 210.

Meanwhile, the image decoding apparatus according to the present disclosure may be referred to as a video/image/picture decoding apparatus. The image decoding apparatus may be classified into an information decoder (video/image/picture information decoder) and a sample decoder (video/image/picture sample decoder). The information decoder may include the entropy decoder 210. The sample decoder may include at least one of the dequantizer 220, the inverse transformer 230, the adder 235, the filter 240, the memory 250, the inter prediction unit 160 or the intra prediction unit 265.

The dequantizer 220 may dequantize the quantized transform coefficients and output the transform coefficients. The dequantizer 220 may rearrange the quantized transform coefficients in the form of a two-dimensional block. In this case, the rearrangement may be performed based on the coefficient scanning order performed in the image encoding apparatus. The dequantizer 220 may perform dequantization on the quantized transform coefficients by using a quantization parameter (e.g., quantization step size information) and obtain transform coefficients.

The inverse transformer 230 may inversely transform the transform coefficients to obtain a residual signal (residual block, residual sample array).

The prediction unit may perform prediction on the current block and generate a predicted block including prediction samples for the current block. The prediction unit may determine whether intra prediction or inter prediction is applied to the current block based on the information on the prediction output from the entropy decoder 210 and may determine a specific intra/inter prediction mode (prediction technique).

It is the same as described in the prediction unit of the image encoding apparatus 100 that the prediction unit may generate the prediction signal based on various prediction methods (techniques) which will be described later.

The intra predictor 265 may predict the current block by referring to the samples in the current picture. The description of the intra prediction unit 185 is equally applied to the intra prediction unit 265.

The inter predictor 260 may derive a predicted block for the current block based on a reference block (reference sample array) specified by a motion vector on a reference picture. In this case, in order to reduce the amount of motion information transmitted in the inter prediction mode, motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter predictor 260 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 235 may generate a reconstructed signal (reconstructed picture, reconstructed block, reconstructed sample array) by adding the obtained residual signal to the prediction signal (predicted block, predicted sample array) output from the prediction unit (including the inter predictor 260 and/or the intra prediction unit 265). If there is no residual for the block to be processed, such as when the skip mode is applied, the predicted block may be used as the reconstructed block. The description of the adder 155 is equally applicable to the adder 235. The adder 235 may be called a reconstructor or a reconstructed block generator. The generated reconstructed signal may be used for intra prediction of a next block to be processed in the current picture and may be used for inter prediction of a next picture through filtering as described below.

The filter 240 may improve subjective/objective image quality by applying filtering to the reconstructed signal. For example, the filter 240 may generate a modified reconstructed picture by applying various filtering methods to the reconstructed picture and store the modified reconstructed picture in the memory 250, specifically, a DPB of the memory 250. The various filtering methods may include, for example, deblocking filtering, a sample adaptive offset, an adaptive loop filter, a bilateral filter, and the like.

The (modified) reconstructed picture stored in the DPB of the memory 250 may be used as a reference picture in the inter predictor 260. The memory 250 may store the motion information of the block from which the motion information in the current picture is derived (or decoded) and/or the motion information of the blocks in the picture that have already been reconstructed. The stored motion information may be transmitted to the inter predictor 260 so as to be utilized as the motion information of the spatial neighboring block or the motion information of the temporal neighboring block. The memory 250 may store reconstructed samples of reconstructed blocks in the current picture and transfer the reconstructed samples to the intra prediction unit 265.

In the present disclosure, the embodiments described in the filter 160, the inter prediction unit 180, and the intra prediction unit 185 of the image encoding apparatus 100 may be equally or correspondingly applied to the filter 240, the inter predictor 260, and the intra predictor 265 of the image decoding apparatus 200.

Inter Prediction

The prediction unit of the image encoding apparatus 100 and the image decoding apparatus 200 may derive a prediction sample by performing inter prediction on a per-block basis. Inter prediction can be a prediction derived in a manner that is dependent on data elements (e.g., sample values or motion information) of picture(s) other than the current picture. When inter prediction is applied to a current block, a predicted block (a prediction sample array) for the current block may be derived on the basis of a reference block (a reference sample array) specified by a motion vector on a reference picture indicated by a reference picture index. Herein, in order to reduce the amount of motion information transmitted in the inter prediction mode, the motion information of the current block may be predicted on a per block, subblock, or sample basis on the basis of the correlation of motion information between a neighboring block and the current block. The motion information may include a motion vector and a reference picture index. The motion information may further include inter prediction type (L0 prediction, L1 prediction, Bi prediction, etc.) information. When inter prediction is applied, neighboring blocks may include a spatial neighboring block present in the current picture and a temporal neighboring block present in the reference picture. The reference picture including the reference block and the reference picture including the temporal neighboring block may be the same or different. The temporal neighboring block may be called a collocated reference block or a collocated CU (colCU). The reference picture including the temporal neighboring block may be called a collocated picture (colPic). For example, a motion information candidate list may be constructed on the basis of neighboring blocks of the current block. A flag or index information indicating which candidate is selected (used) to derive a motion vector and/or a reference picture index of the current block may be signaled. Inter prediction may be performed on the basis of various prediction modes. For example, in the case of a skip mode and a merge mode, motion information of a current block may be the same as motion information of a selected neighboring block. In the case of the skip mode, unlike the merge mode, the residual signal may not be transmitted. In the case of a motion information prediction (motion vector prediction, MVP) mode, a motion vector of a selected neighboring block may be used as a motion vector predictor, and a motion vector difference may be signaled. In this case, a motion vector of the current block may be derived using the sum of the motion vector predictor and the motion vector difference.

The motion information may include L0 motion information and/or L1 motion information according to an inter prediction type (L0 prediction, L1 prediction, Bi prediction, etc.). A motion vector in the L0 direction may be called an L0 motion vector or MVL0, and a motion vector in the L1 direction may be called an L1 motion vector or MVL1. The prediction based on the L0 motion vector may be called L0 prediction. The prediction based on the L0 motion vector may be called L0 prediction. The prediction based on both the L0 motion vector and the L1 motion vector may be called bi-prediction. Herein, the L0 motion vector may refer to a motion vector associated with a reference picture list L0 (L0), and the L1 motion vector may refer to a motion vector associated with a reference picture list L1 (L1). The reference picture list L0 may include, as reference pictures, pictures preceding the current picture in terms of output order. The reference picture list L0 may include pictures following the current picture in terms of output order. The preceding pictures may be called forward (reference) pictures, and the following pictures may be called backward (reference) pictures. The reference picture list L0 may further include, as reference pictures, pictures following the current picture in terms of output order. In this case, within the reference picture list L0, the preceding pictures may be indexed first, and the following pictures may be indexed next. The reference picture list L0 may further include, as reference pictures, pictures preceding the current picture in terms of output order. In this case, within the reference picture list1, the following pictures may be indexed first, and the preceding pictures may be indexed next. Herein, the output order may correspond to the picture order count (POC) order.

Figure 4:
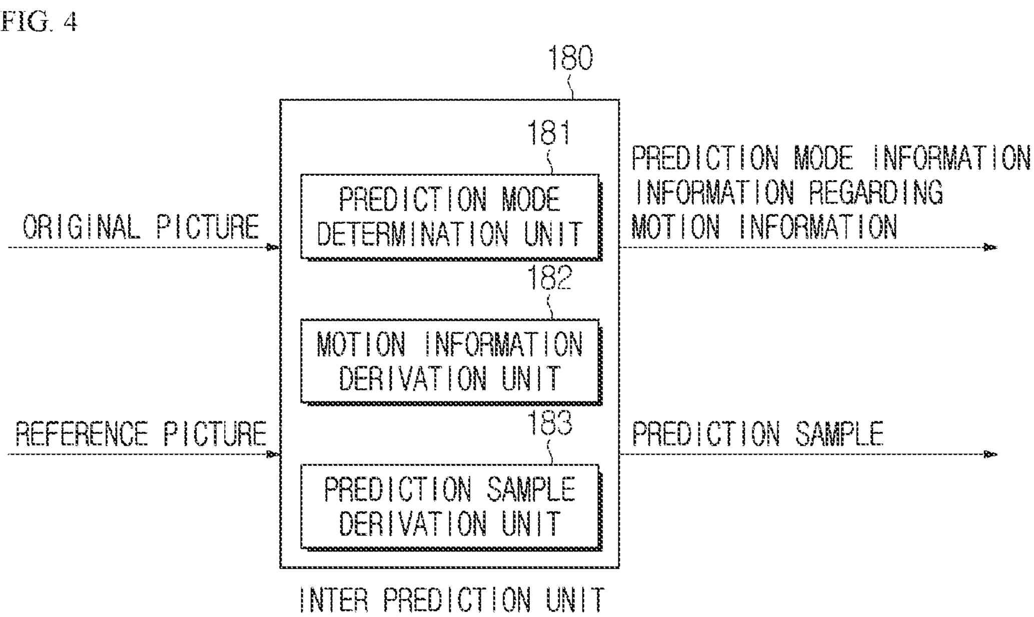
FIG. 4 is a diagram schematically showing an inter prediction unit of an image encoding apparatus.
Figure 5:
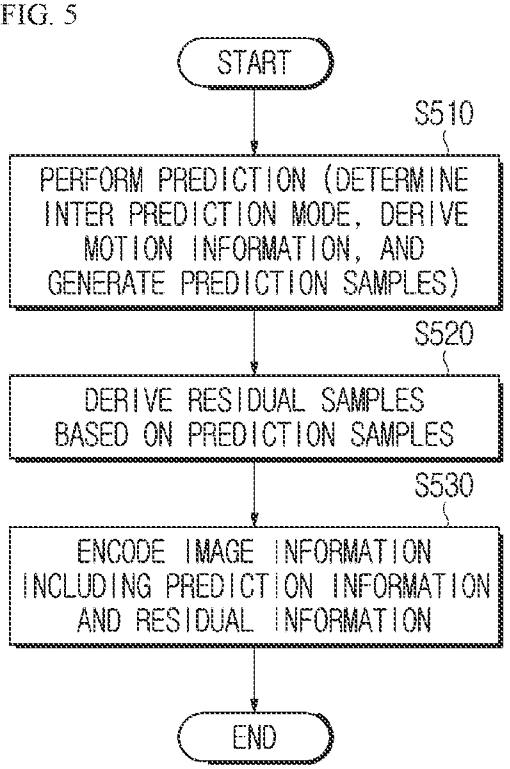
FIG. 5 is a flowchart illustrating a method of encoding an image based on inter prediction.

FIG. 4 is a diagram schematically showing the inter prediction unit 180 of the image encoding apparatus 100, and FIG. 5 is a flowchart illustrating a method of encoding an image based on inter prediction.

The image encoding apparatus 100 may perform inter prediction on a current block (S510). The image encoding apparatus 100 may derive an inter prediction mode and motion information of the current block, and may generate prediction samples of the current block. Herein, the procedures of determination of the inter prediction mode, derivation of the motion information, and generation of the prediction samples may be performed simultaneously, or any one procedure may be performed before the other procedures. For example, the inter prediction unit 180 of the image encoding apparatus 100 may include a prediction mode determination unit 181, a motion information derivation unit 182, and a prediction sample derivation unit 183. The prediction mode determination unit 181 may determine the prediction mode for the current block. The motion information derivation unit 182 may derive the motion information of the current block. The prediction sample derivation unit 183 may derive the prediction samples of the current block. For example, the inter prediction unit 180 of the image encoding apparatus 100 may search a predetermined area (search area) of reference pictures for a block similar to the current block through motion estimation, and may derive a reference block of which the difference from the current block is a minimum or less than or equal to a predetermined standard. On the basis of this, a reference picture index indicating the reference picture in which the reference block is located may be derived, and a motion vector may be derived on the basis of the location difference between the reference block and the current block. The image encoding apparatus 100 may determine a mode applied to the current block among various prediction modes. The image encoding apparatus 100 may compare RD costs for the various prediction modes and may determine the optimum prediction mode for the current block.

For example, when the skip mode or the merge mode is applied to the current block, the image encoding apparatus 100 may construct a merge candidate list described later, and may derive a reference block of which the difference from the current block is a minimum or less than or equal to a predetermined standard, among reference blocks indicated by merge candidates included in the merge candidate list. In this case, the merge candidate associated with the derived reference block may be selected, and merge index information indicating the selected merge candidate may be generated and signaled to the decoding apparatus. The motion information of the current block may be derived using the motion information of the selected merge candidate.

As another example, when the (A) MVP mode is applied to the current block, the image encoding apparatus 100 may construct an (A) MVP candidate list described later, and may use, as a motion vector predictor (mvp) of the current block, a motion vector of an mvp candidate selected among mvp candidates included in the (A) MVP candidate list. In this case, for example, a motion vector indicating a reference block derived by the above-described motion estimation may be used as a motion vector of the current block. Among the mvp candidates, an mvp candidate having the motion vector having the minimum difference from the motion vector of the current block may be the selected mvp candidate. A motion vector difference (MVD) that is a difference resulting from subtracting the mvp from the motion vector of the current block may be derived. In this case, information on the MVD may be signaled to the image decoding apparatus 200. In addition, when the (A) MVP mode is applied, a value of the reference picture index may be constructed as reference picture index information and may be separately signaled to the image decoding apparatus 200.

The image encoding apparatus 100 may derive residual samples on the basis of the prediction samples (S520). The image encoding apparatus 100 may compare the prediction samples with the original samples of the current block to derive the residual samples.

The image encoding apparatus 100 may encode image information including prediction information and residual information (S530). The image encoding apparatus 100 may output the encoded image information in the form of a bitstream. The prediction information is pieces of information related to the prediction procedure, and may include prediction mode information (e.g., a skip flag, a merge flag, or a mode index) and information on motion information. The information on the motion information may include candidate selection information (e.g., a merge index, an mvp flag, or an mvp index) that is information for deriving a motion vector. In addition, the information on the motion information may include the information on the MVD and/or the reference picture index information described above. In addition, the information on the motion information may include information indicating whether L0 prediction, L1 prediction, or bi-prediction is applied. The residual information is information on the residual samples. The residual information may include information on quantized transform coefficients for the residual samples.

The output bitstream may be stored in a (digital) storage medium and transmitted to the decoding apparatus, or may be transmitted to the image decoding apparatus 200 over a network.

In the meantime, as described above, the image encoding apparatus 100 may generate a reconstructed picture (including reconstructed samples and a reconstructed block) on the basis of the reference samples and the residual samples. This is to derive the same prediction result by the image encoding apparatus 100 as that performed in the image decoding apparatus 200, and through this, coding efficiency may be increased. Accordingly, the image encoding apparatus 100 may store a reconstructed picture (or reconstructed samples, a reconstructed block) in a memory, and may use the same as a reference picture for inter prediction. As described above, an in-loop filtering procedure may be further applied to the reconstructed picture.

Figure 6:
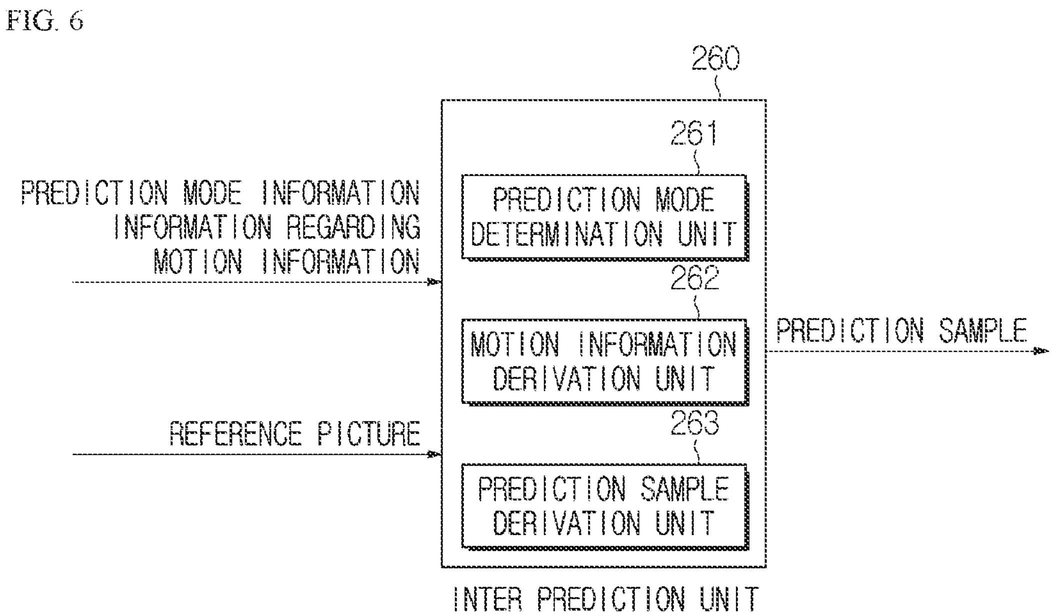
FIG. 6 is a diagram schematically showing an inter prediction unit of an image decoding apparatus.
Figure 7:
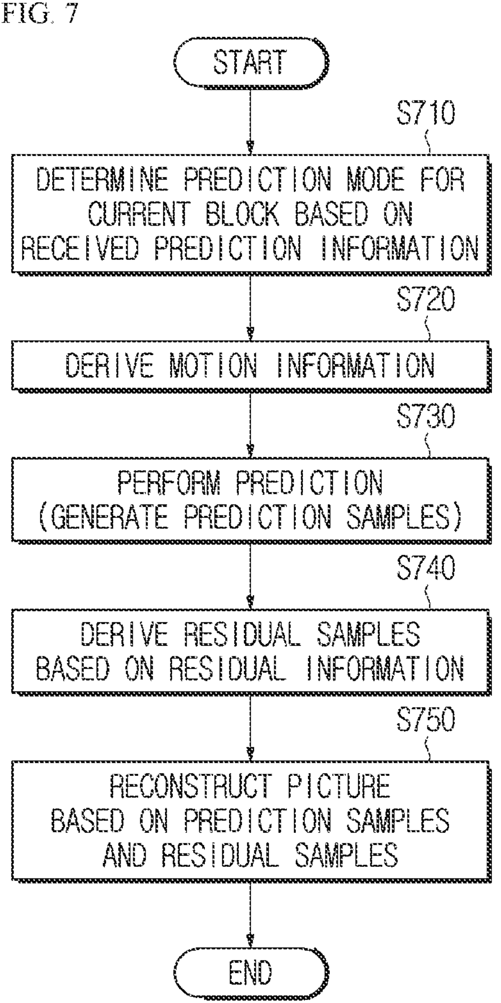
FIG. 7 is a flowchart illustrating a method of decoding an image based on inter prediction.

FIG. 6 is a diagram schematically showing the inter prediction unit 260 of the image decoding apparatus 200, and FIG. 7 is a flowchart illustrating a method of decoding an image based on inter prediction.

The image decoding apparatus 200 may perform the operation corresponding to the operation performed by the image encoding apparatus 100. The image decoding apparatus 200 may perform prediction on the current block on the basis of the received prediction information and may derive prediction samples.

Specifically, the image decoding apparatus 200 may determine a prediction mode for the current block on the basis of the received prediction information (S710). The image decoding apparatus 200 may determine which inter prediction mode is applied to the current block on the basis of the prediction mode information in the prediction information.

For example, on the basis of the merge flag, it may be determined whether the merge mode is applied to the current block or the (A) MVP mode is determined. Alternatively, one of various inter prediction mode candidates may be selected on the basis of the mode index. The inter prediction mode candidates may include a skip mode, a merge mode, and/or an (A) MVP mode, or may include various inter prediction modes described later.

The image decoding apparatus 200 may derive motion information of the current block on the basis of the determined inter prediction mode (S720). For example, when the skip mode or the merge mode is applied to the current block, the image decoding apparatus 200 may construct a merge candidate list described later, and may select one merge candidate among merge candidates included in the merge candidate list. The selection may be performed on the basis of the above-described selection information (a merge index). The motion information of the current block may be derived using the motion information of the selected merge candidate. The motion information of the selected merge candidate may be used as the motion information of the current block.

As another example, when the (A) MVP mode is applied to the current block, the image decoding apparatus 200 may construct an (A) MVP candidate list described later, and may use, as a motion vector predictor (mvp) of the current block, a motion vector of an mvp candidate selected among mvp candidates included in the (A) MVP candidate list. The selection may be performed on the basis of the above-described selection information (an mvp flag or an mvp index). In this case, the MVD of the current block may be derived on the basis of the information on the MVD, and the motion vector of the current block may be derived on the basis of the mvp of the current block and the MVD. In addition, a reference picture index of the current block may be derived on the basis of the reference picture index information. A picture indicated by the reference picture index in the reference picture list related to the current block may be derived as a reference picture that is referenced for inter prediction of the current block.

In the meantime, as will be described later, the motion information of the current block may be derived without constructing a candidate list. In this case, the motion information of the current block may be derived according to a procedure described in a prediction mode described later. In this case, the candidate list configuration as described above may be omitted.

The image decoding apparatus 200 may generate prediction samples for the current block on the basis of the motion information of the current block (S730). In this case, the reference picture may be derived on the basis of the reference picture index of the current block, and the prediction samples of the current block may be derived using samples of a reference block indicated on the reference picture by the motion vector of the current block. In this case, as described later, in some cases, a prediction sample filtering procedure may be further performed on all or some of the prediction samples of the current block.

For example, the inter prediction unit 260 of the image decoding apparatus 200 may include a prediction mode determination unit 261, a motion information derivation unit 262, and a prediction sample derivation unit 263. The prediction mode determination unit 181 may determine the prediction mode for the current block on the basis of received prediction mode information. The motion information derivation unit 182 may derive the motion information (a motion vector and/or a reference picture index) of the current block on the basis of received information on the motion information. The prediction sample derivation unit 183 may derive the prediction samples of the current block.

The image decoding apparatus 200 may generate residual samples for the current block on the basis of the received residual information (S740). The image decoding apparatus 200 may generate reconstructed samples for the current block on the basis of the prediction samples and the residual samples, and may generate, on the basis of this, a reconstructed picture (S750). Afterward, as described above, an in-loop filtering procedure may be further applied to the reconstructed picture.

Figure 8:
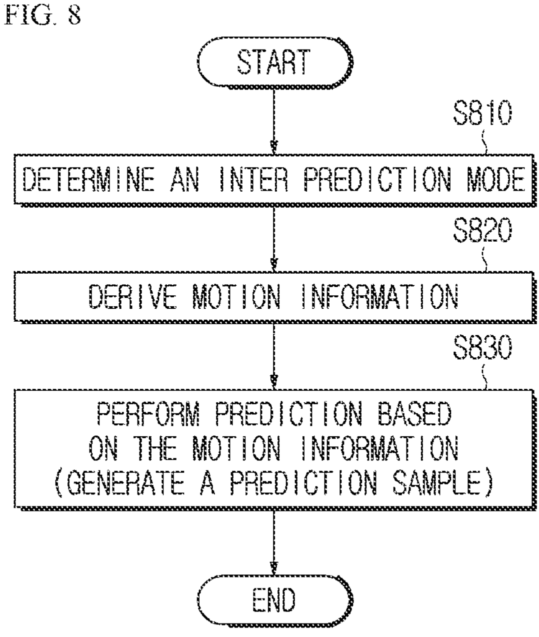
FIG. 8 is a flowchart illustrating an inter prediction method.

Referring to FIG. 8, the inter prediction procedure may include the steps of determining an inter prediction mode (S810), deriving motion information according to the determined prediction mode (S820), and performing prediction based on the derived motion information (generating a prediction sample) (S830). The inter prediction procedure may be performed in the image encoding apparatus 100 and the image decoding apparatus 200 as described above.

Inter Prediction Mode Determination

Various inter prediction modes may be used for prediction of the current block in the picture. For example, various modes, such as a merge mode, a skip mode, a motion vector prediction (MVP) mode, an affine mode, a subblock merge mode, and a merge with MVD (MMVD) mode, and the like may be used. A decoder side motion vector refinement (DMVR) mode, an adaptive motion vector resolution (AMVR) mode, a bi-prediction with CU-level weight (BCW), a bi-directional optical flow (BDOF), and the like may also be used as additional modes additionally or instead. The affine mode may be called an affine motion prediction mode. The MVP mode may be referred to as advanced motion vector prediction (AMVP) mode. In this document, some modes and/or motion information candidates derived by some modes may be included as one of motion information candidates of other modes. For example, an HMVP candidate may be added as a merge candidate in the merge/skip mode or may be added as an mvp candidate in the MVP mode.

Prediction mode information indicating the inter prediction mode of the current block may be signaled from the image encoding apparatus 100 to the image decoding apparatus 200. The prediction mode information may be included in the bitstream and received by the image decoding apparatus 200. The prediction mode information may include index information indicating one of a plurality of candidate modes. Alternatively, the inter prediction mode may be indicated through hierarchical signaling of flag information. In this case, the prediction mode information may include one or more flags. For example, a skip flag may be signaled to indicate whether a skip mode is applied, and if the skip mode is not applied, a merge flag may be signaled to indicate whether a merge mode is applied, and if the merge mode is not applied, it is indicated to apply an MVP mode or a flag for additional classification may be further signaled. The affine mode may be signaled in an independent mode or may be signaled in a mode dependent on the merge mode or the MVP mode. For example, the affine mode may include an affine merge mode and an affine MVP mode.

Derivation of Motion Information

Inter prediction may be performed using motion information of the current block. The image encoding apparatus 100 may derive optimal motion information for the current block through a motion estimation procedure. For example, the image encoding apparatus 100 may search for a similar reference block having a high correlation in units of fractional pixels within a predetermined search range in the reference picture using the original block in the original picture for the current block, thereby deriving motion information. Similarity of blocks may be derived based on a difference of phase based sample values. For example, the similarity of the blocks may be calculated based on the SAD between the current block (or template of the current block) and the reference block (or template of the reference block). In this case, motion information may be derived based on a reference block having the smallest SAD in the search area. The derived motion information may be signaled to the image decoding apparatus 200 according to various methods based on the inter prediction mode.

Generation of Prediction Sample

A predicted block for the current block may be derived based on motion information derived according to the prediction mode. The predicted block may include prediction samples (prediction sample array) of the current block. When the motion vector of the current block indicates a fractional sample unit, an interpolation procedure may be performed, through which prediction samples of the current block may be derived based on reference samples in the fractional sample unit within a reference picture. When affine inter prediction is applied to the current block, prediction samples may be generated based on a sample/subblock unit MV. When bi-prediction is applied, prediction samples derived through weighting or weighted averaging (according to phase) of prediction samples derived based on L0 prediction (that is, prediction using reference picture and MVL0 in reference picture list L0) and prediction samples derived based on L0 prediction (that is, prediction using reference picture and MVL1 in reference picture list L1) may be used as prediction samples of the current block. When bi-prediction is applied, if the reference picture used for L0 prediction and the reference picture used for L0 prediction are located in different temporal directions with respect to the current picture (i.e., bi-prediction and bidirectional prediction), it may be called true bi-prediction.

As described above, reconstructed samples and reconstructed pictures may be generated based on the derived prediction samples, and thereafter, a procedure such as in-loop filtering may be performed.

Template Matching (TM)

Figure 9:
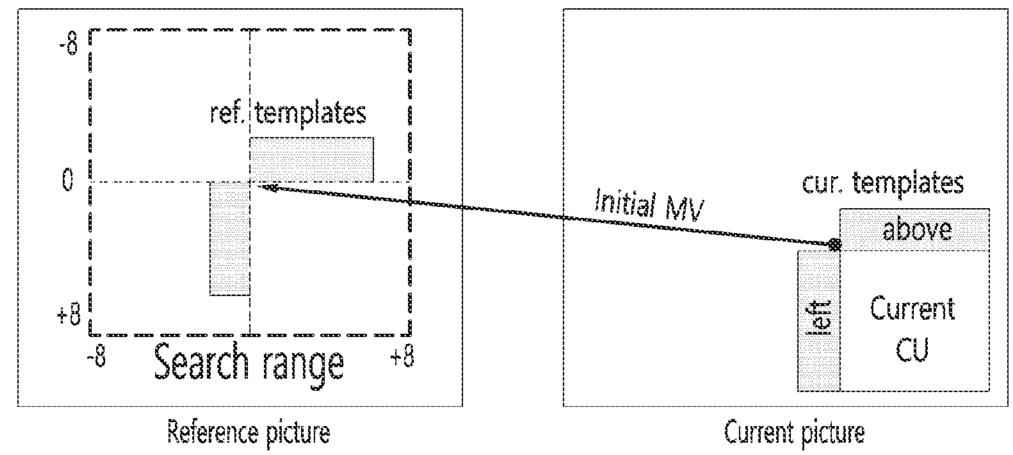
FIG. 9 is a flowchart illustrating an image encoding method according to an embodiment of the present disclosure.

FIG. 9 is a diagram for explaining a template matching-based encoding/decoding method according to the present disclosure.

Template Matching (TM) is a motion vector derivation method performed at a decoder stage, and is a method of refining motion information of a current block by finding a template (hereinafter referred to as "reference template") in a reference picture which is most similar to a template (hereinafter referred to as "current template") adjacent to the current block (e.g., current coding unit, current CU). The current template may be a top neighboring block and/or a loft neighboring block of the current block, or may be some of these neighboring blocks. Additionally, the reference template may be determined to have the same size as the current template.

As shown in FIG. 9, when an initial motion vector of the current block is derived, a search for a better motion vector may be performed in the surrounding area of the initial motion vector. For example, the range of the surrounding area where the search is performed may be within the [−8, +8]-pel search area centered on the initial motion vector. Additionally, the size of the search step for performing the search may be determined based on the AMVR mode of the current block. Additionally, template matching may be performed continuously with a bilateral matching process in the merge mode.

If the prediction mode of the current block is the AMVP mode, a motion vector predictor candidate (MVP candidate) may be determined based on a template matching error. For example, a motion vector predictor candidate (MVP candidate) that minimizes an error between the current template and the reference template may be selected. After that, template matching for refining a motion vector may be performed on the selected motion vector predictor candidate. At this time, template matching for refining a motion vector may not be performed on motion vector predictor candidates that are not selected.

More specifically, the refinement of the selected motion vector predictor candidate may start from full-pel (integer-pel) accuracy within the [−8, +8]-pel search area using an iterative diamond search. Alternatively, in the case of a 4-pel AMVR mode, it may start from 4-pel accuracy. After that, a search with half-pel and/or quarter-pel accuracy may follow depending on the AMVR mode. According to the search process, the motion vector predictor candidate may maintain the same motion vector accuracy as indicated by the AMVR mode even after the template matching process. In the iterative search process, if a difference between a previous minimum cost and a current minimum cost is less than an arbitrary threshold, the search process is terminated. The threshold may be equal to the area of a block, i.e., the number of samples in the block. Table 1 shows examples of search patterns according to the AMVR mode and the merge mode accompanied with AMVR.

TABLE 1

| | AMVR mode | | | | Merge mode | |
|---|---|---|---|---|---|---|
| Search pattern | 4-pel | Full-pel | Half-pel | Quarter-pel | AltIF = 0 | AltIF = 1 |
| 4-pel diamond | v | | | | | |
| 4-pel cross | v | | | | | |
| Full-pel diamond | | v | v | v | v | v |
| Full-pel cross | | v | v | v | v | v |
| Half-pel cross | | | v | v | v | v |
| Quarter-pel cross | | | | v | v | |
| ⅛-pel cross | | | | | v | |

If the prediction mode of the current block is the merge mode, a similar search method may be applied to the merge candidate indicated by the merge index. As shown in Table 1 above, template matching may be performed up to ⅛-pel accuracy or half-pel accuracy or lower may be skipped, which may be determined depending on whether an alternative interpolation filter is used according to the merge motion information. In this case, the alternative interpolation filter may be a filter used when AMVR is the half-pel mode. In addition, if template matching is available, depending on whether bilateral matching (BM) is available, the template matching may operate as an independent process, or may operate as an additional motion vector refinement process between block-based bilateral matching and sub-block-based bilateral matching. Whether the template matching is available and/or whether the bilateral matching is available may be determined according to an availability condition check. In the above, the accuracy of the motion vector may mean the accuracy of a motion vector difference (MVD).

Adaptive Reordering of Merge Candidates with Template Matching (ARMC-TM)

Merge candidates may be adaptively reordered through template matching. The reordering method may be applied to a regular merge mode, a template matching (TM) merge mode, and an affine merge mode (except for SbTMVP candidate). In the case of the TM merge mode, the reordering of the merge candidates may be performed before the above-described motion vector refinement process. After a merge candidate list is constructed, merge candidates may be divided into one or more subgroups. The size of the subgroup for the regular merge mode and the TM merge mode may be 5. In addition, the size of the subgroup for the affine merge mode may be 3. The merge candidates in each subgroup may be reordered in ascending order according to cost values based on template matching. For simplicity, the merge candidates in the last subgroup, not the first subgroup, may not be reordered.

The template matching cost of a merge candidate may be measured by the sum of absolute differences (SAD) between samples of a template of a current block and reference samples corresponding thereto. At this time, the template may include a set of reconstructed samples neighboring the current block. The reference samples of the template may be located by motion information of the merge candidate.

Figure 10:
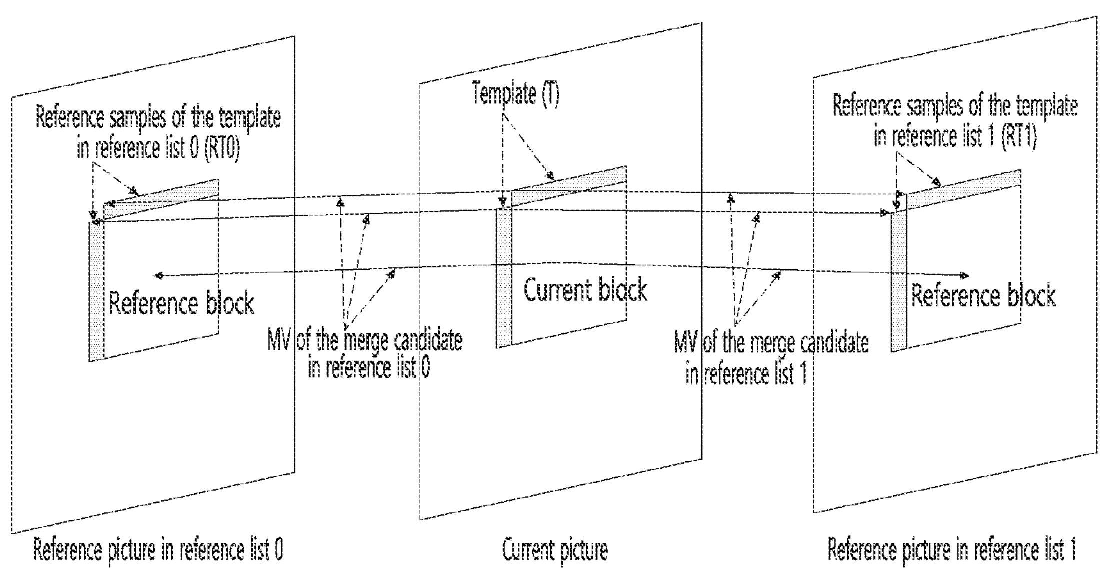
FIG. 10 is a flowchart illustrating an image decoding method according to an embodiment of the present disclosure.

FIG. 10 is a diagram exemplarily illustrating a template of a current block and reference samples of templates in reference pictures. When a merge candidate uses bi-prediction, reference samples of the template of the merge candidate may be generated as illustrated in FIG. 10. Specifically, after a reference block of a reference picture in list 0 is specified based on a list 0 (L0) motion vector of a merge candidate of a current block, a reference template (reference template 0, RT0) of the reference picture in list 0 may be specified. Similarly, after a reference block of a reference picture in list 1 is specified based on a list 1 (L1) motion vector of a merge candidate of a current block, a reference template (reference template 1, RT1) of a reference picture in list 1 may be specified.

For a sub-block-based merge candidate where the size of a sub-block is Wsub×Hsub, an upper template may include one or more sub-templates with a size of Wsub×1, and a left template may include one or more sub-templates with a size of 1×Hsub.

Figure 11:
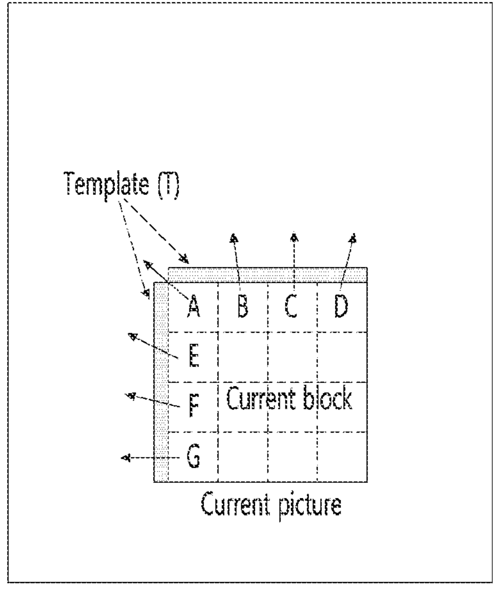
FIG. 11 is a diagram for explaining a method of specifying a template using motion information of a sub-block.
Figure 11:
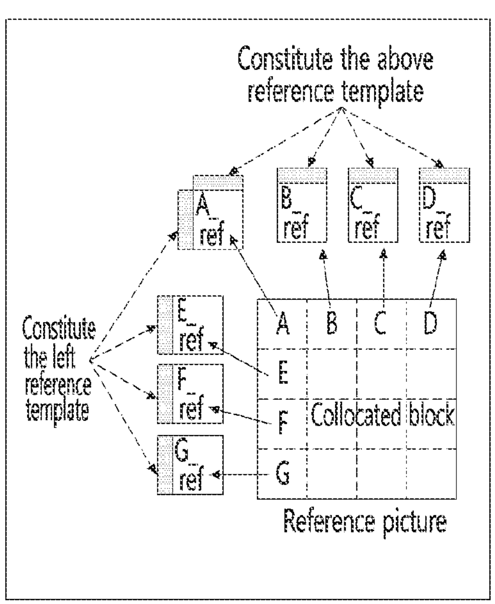

FIG. 11 is a diagram for explaining a method of specifying a template using motion information of a sub-block.

Figure 15:
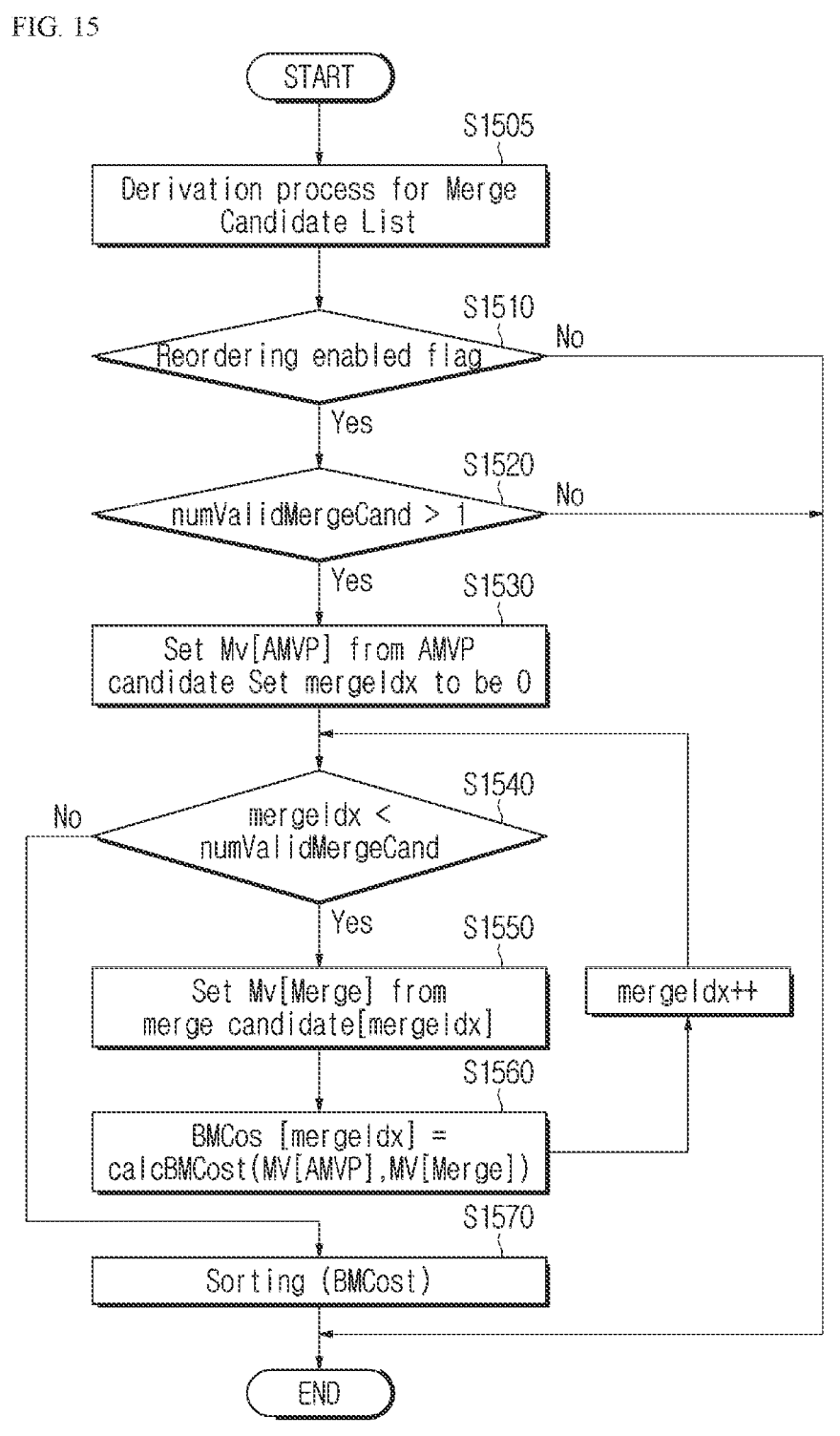

In the example illustrated in FIG. 11, reference samples of each sub-template may be derived using motion information of sub-blocks included in a first column and first row of a current block. More specifically, reference sub-blocks (A_ref, B_ref, C_ref, D_ref, E_ref, F_ref, G_ref) corresponding to a reference picture may be specified using motion vectors of sub-blocks (A, B, C, D, E, F, G) included in the first column and first row of the current block in the current picture. For example, the location of the corresponding reference sub-block may be specified from a collocated block in the reference picture based on the motion vector of each sub-block. Thereafter, reference templates may be constituted from a reconstructed region adjacent to each reference sub-block. As illustrated in FIG. 15, when the size of a sub-block is Wsub×Hsub, an upper reference template may include one or more sub-reference templates with a size of Wsub×1, and a left reference template may include one or more sub-reference templates with a size of 1×Hsub.

In the present disclosure, template matching may be a process of searching for a reference template with the highest similarity to a current template. According to the present disclosure, a template matching cost (TM cost) may be calculated to measure the similarity, and a cost function such as SAD may be used for this purpose. A high template matching cost may mean that the template matching error is large and therefore the similarity between templates is low. Conversely, a small template matching cost may mean that the template matching error is small and therefore the similarity between templates is high.

In the present disclosure, the cost function for calculating the template matching cost may be a function that uses a difference between a sample value in the current template and a corresponding sample value in the reference template. Therefore, the cost function may be referred to as a "difference (error)-based function" or "difference (error)-based equation" between corresponding samples in two templates. In addition, the template matching cost calculated by the cost function may be referred to as a "difference (error)-based function value" or "difference (error)-based value" between corresponding samples in two templates.

In the present disclosure, "cost" may be referred to as "error", "error", etc. That is, in the present disclosure, cost", "error" and "error" may have the same meaning. Therefore, the "cost function" may also be referred to as an "error function", "error function", etc. The cost may be derived based on the difference between the current template and the reference template and thus may correspond to the error value for the current block.

Decoder Side Motion Vector Refinement (DMVR)

DMVR is a method of performing motion prediction by refining motion information of neighboring blocks on a decoder side. When DMVR is applied, the decoder may derive refined motion information through cost comparison based on a template generated using motion information of neighboring blocks in merge/skip mode. In this case, DMVR can increase the precision of motion prediction and improve compression performance without additional signaling information. In the present disclosure, for the convenience of explanation, the decoder is focused upon, but DMVR according to the present disclosure may be performed in the same manner in an encoder.

DMVR may be an example of a motion information derivation procedure in that a motion vector is refined. Alternatively, the present disclosure may be included in an example of a prediction sample generation procedure since a prediction sample is generated based on reference blocks indicated by a refined motion vector pair.

Figures 12, 13:
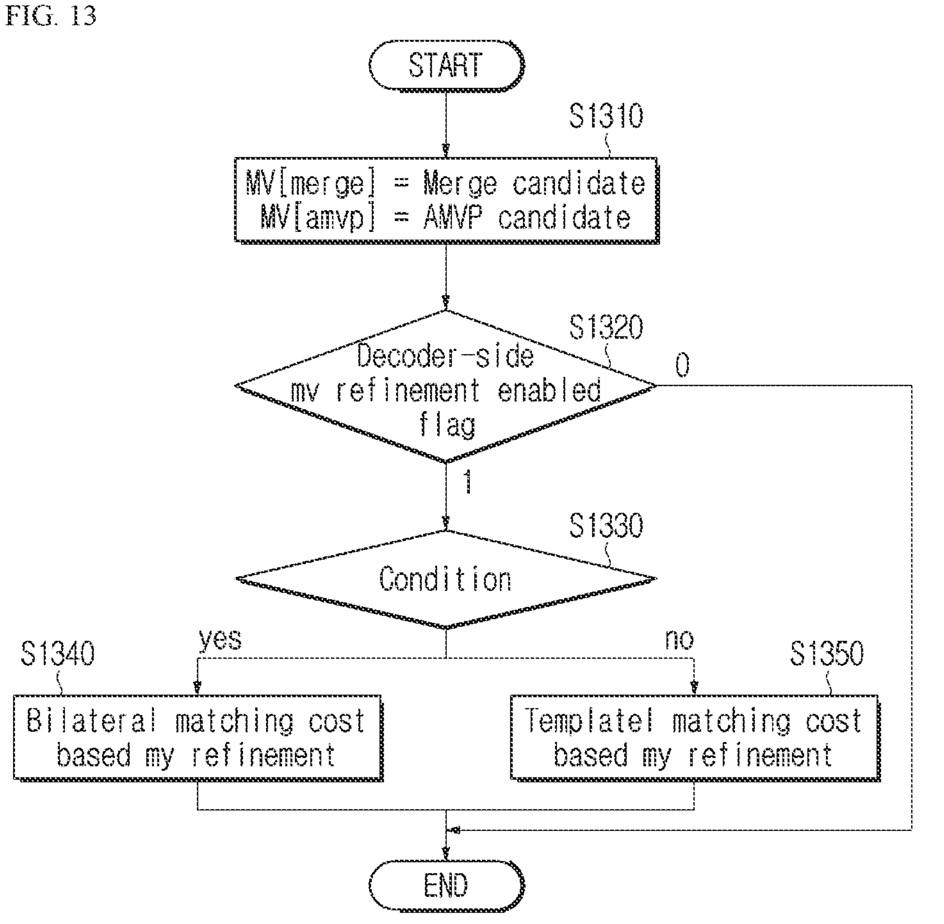
FIG. 12 is a diagram illustrating an example of Decoder-side Motion Vector Refinement (DMVR) according to an embodiment of the present disclosure.
FIGS. 13 to 14 are flowcharts showing an operation of an amvpMerge mode according o an embodiment of the present disclosure.

FIG. 12 is a diagram illustrating an example of DMVR according to an embodiment of the present disclosure.

In bilateral prediction, a refined MV (Motion Vector) may be searched around initial MVs (i.e., MV0 and/or MV1) of the reference picture list L0 and the reference picture list L1. A bilateral matching (BM) method may calculate a distortion between two candidate blocks included in the reference picture list L0 and the reference picture list L1. As illustrated in FIG. 12, a sum of absolute difference (SAD) between blocks based on each MV candidate existing in the search range around the initial MVs (blocks indicated by MVdiff in FIG. 12) may be calculated. Then, a MV candidate with the lowest SAD may be refined MVs (i.e., MV0' and/or MV1'), and a bi-prediction signal may be generated using the refined MVs.

In template matching according to an embodiment of the present disclosure, as described with reference to FIG. 9, in uni-prediction, a refined motion vector that minimizes a template matching cost within a search range around an initial motion vector is derived, and at this time, the template matching cost may be calculated as SAD based on an error between a sample value in a current template and a corresponding sample value in a reference template. In addition, in bilateral matching according to an embodiment of the present disclosure, as described with reference to FIG. 12, in bilateral prediction, a refined motion vector that minimizes distortion between two reference blocks (a first reference block and a second reference block) indicated by an initial MV and MVdiff is derived, and at this time, a bilateral matching cost may be calculated. In this case, the bilateral matching cost may be calculated as SAD based on an error between a sample value in the first reference block and a sample value in the second reference block. In the present disclosure, calculation of the template matching cost and the bilateral matching cost is not limited to SAD, and may be calculated by various differential functions based on an error between two corresponding sample values.

In an embodiment, the decoder may invoke a DMVR process to improve the accuracy of initial motion compensation prediction (i.e., motion compensation prediction via conventional merge/skip mode). For example, the decoder may perform the DMVR process when the prediction mode of a current block is a merge mode or skip mode, and bilateral bi-prediction is applied to the current block, where bilateral reference pictures are in opposite directions with respect to the current picture in display order.

In particular, DMVR may be applied to an encoded CU having the following modes and features:

- In the case of CU-level merge mode using bi-prediction MV
- In the case of one reference picture being a picture before a current picture and another reference picture being a reference picture after the current picture, based on the current picture
- In the case of the distances from the two reference pictures to the current picture (i.e., POC difference) being the same
- In the case of the CU having 64 or more luma samples
- In the case of both CU height and CU width being 8 or more luma samples
- In the case of the BCW weight index indicating the same weight
- In the case where Weighted Prediction (WP) is not enabled for a current block The refined MV derived through the DMVR process may be used to generate inter prediction samples. In addition, the refined MV derived through the DMVR process may be used for temporal motion vector prediction for encoding pictures after the current picture. Meanwhile, the initial MV may be used for a deblocking process, and also may be used for spatial motion vector prediction for encoding pictures before the current picture.

DMVR according to the present disclosure is a refinement of the conventional DMVR described above, and may be referred to as DMVD (Decoder-side Motion Vector Derivation) in the present disclosure. Specifically, DMVR according to the present disclosure may include not only the MV refinement process based on bilateral matching described with reference to FIG. 12, but also the MV refinement process based on template matching. For example, when unilateral prediction is performed or when bilateral prediction is performed but the bilateral matching condition is not satisfied, DMVR according to the present disclosure may perform MV refinement based on template matching. Here, the case where the bilateral matching condition is not satisfied may mean, for example, the case where distances between a current picture and two reference pictures existing in opposite directions with respect to the current picture are different from each other, or the case where two reference pictures exist in the same direction (forward or backward) with respect to the current picture. As described above, DMVR according to the present disclosure may be referred to as DMVD, and may be an MV refinement process based on bilateral matching or template matching.

AMVP (Advanced Motion Vector Prediction)-MERGE Mode

In the amvpMerge mode, a bilateral predictor may be composed of an amvp predictor in an arbitrary direction and a merge predictor in the opposite direction. When there is at least one reference picture in a previous direction and at least one reference picture in a subsequent direction with respect to a current picture, the amvpMerge mode may be applied to a coding block.

In the amvpMerge mode proposed in the present disclosure, the amvp may be signaled as a general unilateral amvp. That is, a reference index and a Motion Vector Difference (MVD) may be signaled. In addition, when template matching is used, an MVP index may be derived, and when template matching is not used, an MVP index may be signaled. In this case, a direction in which the amvp mode is applied may be represented as LX. Here, X may be 0 or 1.

The opposite direction (1-LX) to the direction in which the amvp mode is applied is predicted by Merge, and may be implicitly derived through bilateral matching. Specifically, a merge predictor for merge prediction may be derived by minimizing the bilateral matching cost between an amvp predictor and a merge predictor (e.g., a pair of amvp motion vector and merge motion vector). More specifically, the bilateral matching cost using the merge candidate MV and the amvp MV may be calculated for all merge candidates in a merge candidate list having the opposite direction (1-LX) motion vector. Among them, the merge candidate with the lowest cost may be selected as the merge predictor. Thereafter, bilateral matching-based motion information refinement using the selected merge candidate MV (merge predictor) and amvp MV (amvp predictor) as a starting point may be applied to the current block.

Hereinafter, an image encoding/decoding method according to various embodiments of the present disclosure will be described in detail.

The present disclosure relates to an amvpMerge mode, and more specifically, to a prediction candidate construction method of the amvpMerge mode and a motion information derivation process of the amvpMerge mode. The amvpMerge mode may basically derive motion information by bilateral prediction, and for an arbitrary prediction direction (LX), an MVP index, an MVD, a reference index, etc. may be signaled in a bitstream to predict motion information by the amvp prediction method. In addition, for the opposite prediction direction (1-LX), merge prediction candidate construction that refers to a temporally opposite direction of the reference picture of the amvp prediction candidate may be performed. In this process, a bilateral matching cost is calculated by using the merge prediction candidate and the motion information in the amvp prediction direction, and a merge prediction candidate list of the amvpMerge mode may be constructed by sorting the calculated bilateral matching cost in ascending order. When motion information of the amvpMerge prediction candidate is selected, a motion information refinement operation may be additionally performed on the selected motion information based on a template matching cost or a bilateral matching cost. The "candidate" of the present disclosure may be a "motion candidate" or a "motion information candidate."

Due to the structural reasons of the conventional amvpMerge prediction described above, if DMVR for the current CLVS (Coded Layer Video Sequence) is not enabled at the SPS level, or if DMVR is enabled for the current CLVS but all reference pictures of a current slice to be decoded are located only in front (or behind) of the current slice in terms of display time, amvpMerge prediction may not be enabled.

The present disclosure can improve compression efficiency by applying amvpMerge prediction even if cost-based motion information reordering and/or motion information refinement is not enabled in CLVS by an SPS flag controlling DMVR at the SPS level.

Embodiment 1

FIG. 13 is a flowchart illustrating an operation method of an amvpMerge mode according to an embodiment of the present disclosure.

According to the present embodiment, a process of refining motion information of an amvpMerge candidate may be skipped (bypassed) based on information (flag) controlling DMVR. The information controlling the DMVR may be signaled at any level (e.g., SPS, PPS, PH, SH, etc.) of a higher level of a block.

Referring to FIG. 13, in the present disclosure, a motion vector of a current block may be set to an amvp mode for an arbitrary direction (LX) with respect to a current block, and the motion vector of the current block may be set to a merge mode for the opposite direction (1-LX). That is, the inter prediction unit 260 may set an amvp motion vector from an amvp prediction candidate for an arbitrary direction, and may set a merge motion vector from a merge prediction candidate for the opposite direction (S1310). Thereafter, the inter prediction unit 260 may check a flag indicating whether DMVR is enabled or not (S1320). Here, if the flag indicating whether DMVR is enabled or not indicates a first value (i.e., 0), a motion information refinement process based on a bilateral matching cost or a motion information refinement process based on a template matching cost may be skipped. For example, in this case, amvpMerge prediction based on amvpMerge motion information in which the motion information refinement process is skipped may be performed (not shown). On the other hand, if the flag indicating whether DMVR is enabled or not indicates the second value (i.e., 1), a motion information refinement process based on a bilateral matching cost or a motion information refinement process based on a template matching cost may be performed. At this time, the inter prediction unit 260 may check a specific condition (S1330). Here, the specific condition may be, for example, a condition for checking whether the motion information refinement is performed based on a bilateral matching cost or based on a template matching cost. Alternatively, the specific condition may be a condition for checking whether the motion information refinement based on a bilateral matching cost may be performed or whether the motion information refinement based on a template matching cost may be performed. For example, if the condition for performing the motion information refinement based on the bilateral matching cost is satisfied in step S1330, the motion information refinement based on the bilateral matching cost may be performed on the amvpMerge motion information set in step S1310 (S1340). On the other hand, if the condition for performing the motion information refinement based on the bilateral matching cost is not satisfied, the motion information refinement based on the template matching cost may be performed on the amvpMerge motion information set in step S1310 (S1350). Thereafter, amvpMerge prediction based on the amvpMerge motion information refined in step S1340 or step S1350 may be performed (not shown).

Figure 14:
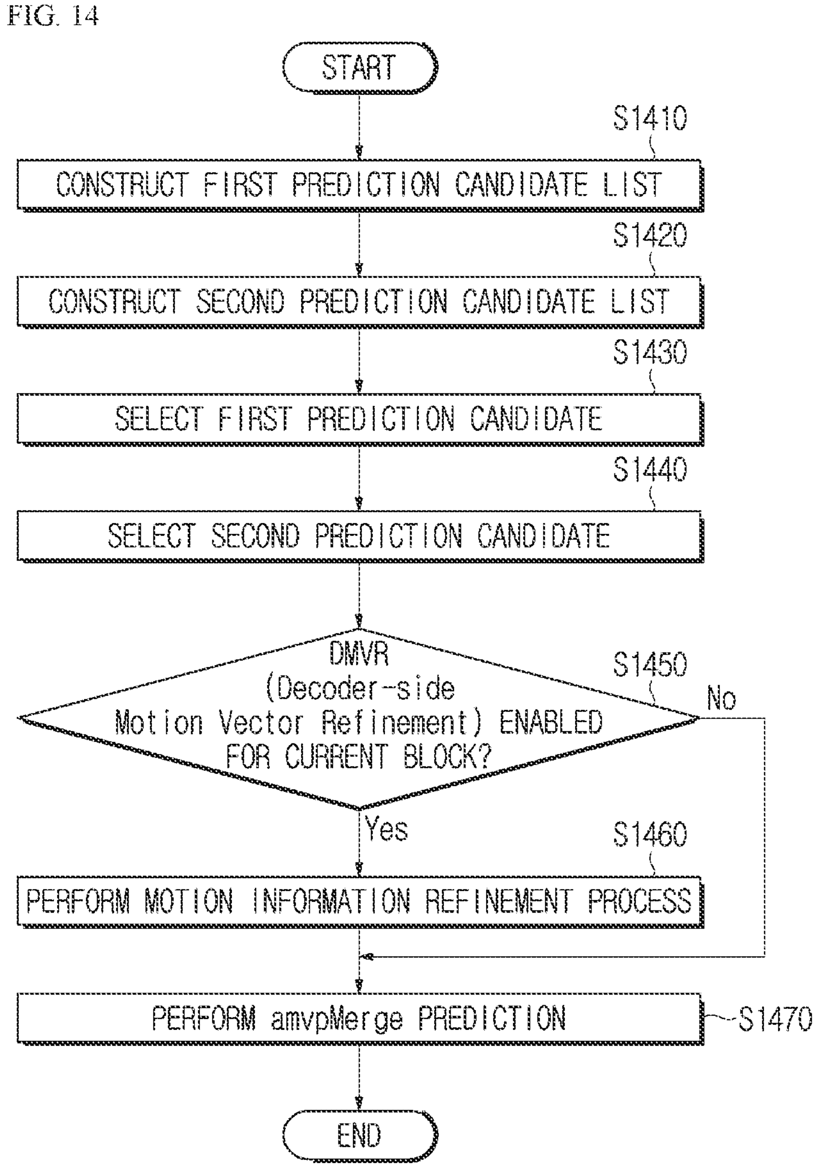

FIG. 14 is a flowchart illustrating an operation method of an amvpMerge mode according to an embodiment of the present disclosure. Referring to FIG. 14, the inter prediction unit 260 may construct a first prediction candidate list (S1410). Here, the first prediction candidate list may be a list of motion information candidates constructed for a first prediction direction (LX). In addition, a prediction mode for constructing the first prediction candidate list may be an amvp mode. The inter prediction unit 260 may construct a second prediction candidate list (S1420). Here, the second prediction candidate list may be a list of motion information candidates constructed for a second prediction direction (1-LX). In addition, a prediction mode for constructing the second prediction candidate list may be a merge mode. The first prediction direction and the second prediction direction according to the present disclosure may be opposite directions based on a current picture including a current block. After constructing the first prediction candidate list and the second prediction candidate list, the inter prediction unit 260 may select a first prediction candidate from the first prediction candidate list (S1430) and select a second prediction candidate from the second prediction candidate list (S1440). Thereafter, the inter prediction unit 260 may check whether DMVR is enabled for the current block (S1450). At this time, whether DMVR is enabled for the current block may be checked through information (flag) signaled at a higher level of the block. If the flag indicating whether DMVR is enabled for the current block has a first value (i.e., 0), the motion information refinement process may be skipped (NO in S1450). On the other hand, if the flag value indicating whether DMVR is enabled for the current block has a second value (i.e., 1), the motion information refinement process may be performed (S1460). Thereafter, amvpMerge prediction based on the amvpMerge motion information selected in steps $1430 and S1440 or the amvpMerge motion information refined in step S1460 may be performed (S1470). In this way, the present disclosure may apply the amvpMerge mode by skipping the motion information refinement process even when DMVR is not enabled for the current block.

According to the present embodiment described with reference to FIGS. 13 and 14, since amvpMerge prediction may be performed even when DMVR is not enabled, the efficiency of image compression can be improved.

Embodiment 2

According to the present embodiment, a merge prediction direction prediction candidate reordering process of an amvpMerge candidate may be skipped based on information (flag) controlling merge candidate reordering based on a template matching cost or bilateral matching cost. The information controlling the merge candidate reordering may be signaled at any level (e.g., SPS, PPS, PH, SH, etc.) of the higher level of the block. The flag referenced in the present embodiment may be the same flag as the flag referenced in Embodiment 1.

FIG. 15 is a flowchart illustrating a process for deriving a merge candidate list in an amvpMerge mode according to an embodiment of the present disclosure.

Referring to FIG. 15, the inter prediction unit 260 may derive a merge candidate list of an amvpMerge mode (S1505). Thereafter, the inter prediction unit 260 may check a reordering enabled flag for the derived merge candidate list (S1510). If the reordering enabled flag is a first value (i.e., 0), the inter prediction unit 260 may skip the reordering process of the merge candidates for the merge candidate list. For example, in this case, motion information in the merge prediction direction may be determined based on the merge candidate list for which the reordering process of the merge candidates is skipped, and amvpMerge prediction may be performed using the same (not shown). On the other hand, if the reordering enabled flag is a second value (i.e., 1), the inter prediction unit 260 may check whether the number of valid merge candidates (numValidMergeCand) included in the merge candidate list is greater than 1 (S1520). At this time, the inter prediction unit 260 may skip the reordering process of the merge candidates if the number of valid merge candidates is not greater than 1. For example, in this case, the motion information in the merge prediction direction is determined based on the merge candidate list for which the reordering process of the merge candidates is skipped, and amvpMerge prediction may be performed using the same (not shown). On the other hand, if the number of valid merge candidates is greater than 1, the reordering process of the merge candidates may be performed. Specifically, the inter prediction unit 260 may set an amvp motion vector from the amvp candidate list and set a merge index (mergeidx) value to 0 ($1530). Thereafter, the inter prediction unit 260 may check whether the merge index value is less than the number of valid merge candidates (S1540). If the merge index value is less than the number of valid merge candidates, calculation of the bilateral matching cost may be performed. Specifically, the inter prediction unit 260 may set a merge motion vector from the merge candidate list using the current merge index (S1550). Thereafter, the inter prediction unit 260 may calculate a bilateral matching cost based on the amvp motion vector set in step S1530 and the merge motion vector set in step S1550, and the calculated cost may be stored as a bilateral matching cost for the merge candidate indicated by the current merge index (S1560). Thereafter, by adding 1 to the merge index value and repeating steps S1540 to S1560, the bilateral matching cost may be calculated for all valid merge candidates included in the merge candidate list.

In step S1540, if the merge index value is not less than the number of valid merge candidates, the calculation of the bilateral matching cost for all valid merge candidates included in the merge candidate list is completed, so the reordering process of the merge candidates based on the bilateral matching cost may be performed (S1570). Thereafter, based on the merge candidate list for which the reordering process of the merge candidates has been performed, motion information in the merge prediction direction is determined, and amvpMerge prediction may be performed using the same (not shown).

The reordering process of step S1570 may be performed in ascending order of the bilateral matching costs. This allows a merge candidate with a small bilateral matching cost to be positioned at the top of the merge candidate list. As an effect of the reordering of the merge candidates, a merge candidate with a high possibility of selection may be positioned at the top of the merge candidate list. This allows determination of a merge candidate with a minimum bilateral matching cost. Alternatively, since a low index value requiring a relatively small number of bits may be signaled, the overhead of signaling can be reduced.

Figure 16:
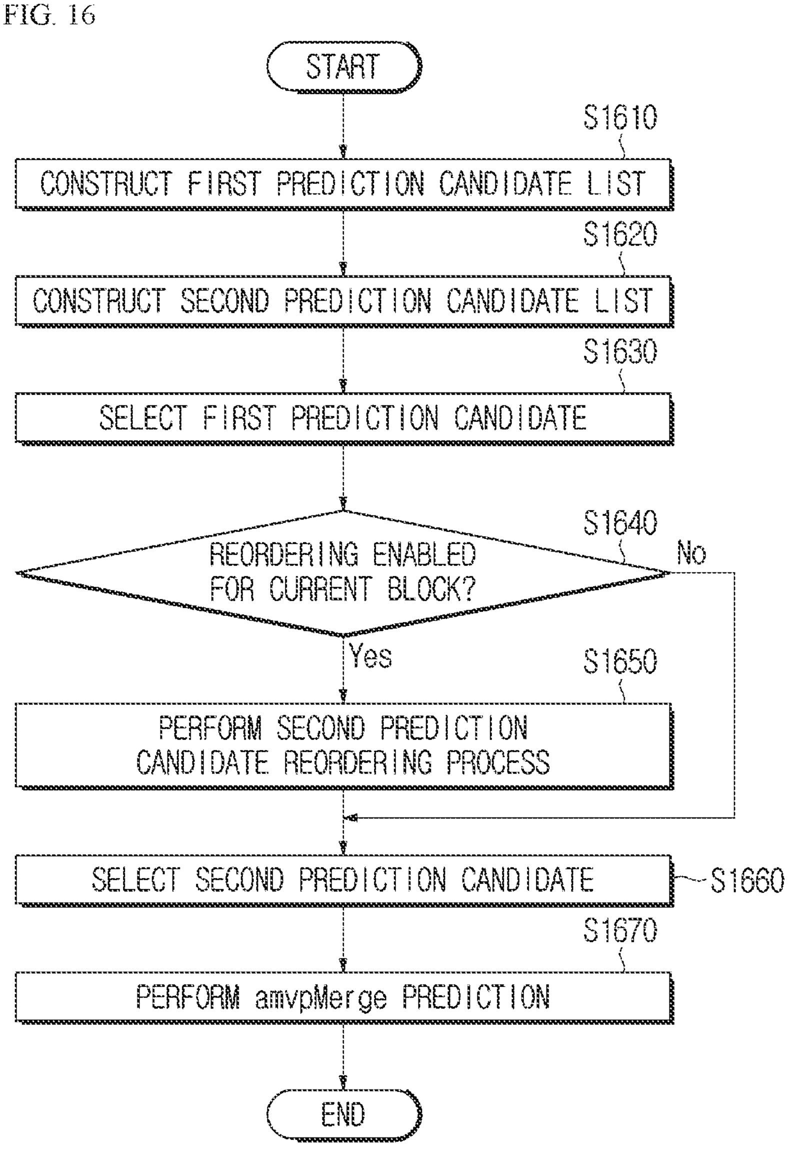
FIG. 16 is a flowchart illustrating an operation method of an amvpMerge mode according to an embodiment of the present disclosure.

FIG. 16 is a flowchart illustrating an operation method of an amvpMerge mode according to an embodiment of the present disclosure. Referring to FIG. 16, the inter prediction unit 260 may construct a first prediction candidate list (S1610). Here, the first prediction candidate list may be a list of motion information candidates constructed for a first prediction direction (LX). In addition, a prediction mode for constructing the first prediction candidate list may be an amvp mode. The inter prediction unit 260 may construct a second prediction candidate list (S1620). Here, the second prediction candidate list may be a list of motion information candidates constructed for a second prediction direction (1-LX). In addition, a prediction mode for constructing the second prediction candidate list may be a merge mode. The first prediction direction and the second prediction direction according to the present disclosure may be opposite directions with respect to a current picture including a current block. After constructing the first prediction candidate list and the second prediction candidate list, the inter prediction unit 260 may select a first prediction candidate from the first prediction candidate list (S1630). Thereafter, a reordering process for a second prediction candidate (e.g., merge candidate) may be performed to select a second prediction candidate from the second prediction candidate list. More specifically, the inter prediction unit 260 may check whether reordering of the second prediction candidate is enabled for the current block (S1640). At this time, whether reordering of the second prediction candidate is enabled for the current block may be checked through information (flag) signaled at a higher level of the block. At this time, information indicating whether reordering of the second prediction candidate is enabled for the current block and information indicating whether DMVR is enabled for the current block may be the same. If the flag indicating whether reordering of the second prediction candidates for the current block is enabled has a first value (i.e., 0), the reordering process of the second prediction candidates may be skipped (NO in S1640). On the other hand, if the flag value indicating whether reordering of the second prediction candidates for the current block is enabled has a second value (i.e., 1) (Yes in S1640), the second prediction candidate reordering process may be performed (S1650). Thereafter, the second prediction candidate reordering process is skipped or the second prediction candidate is selected based on the second prediction candidate list for which the second prediction candidate reordering process has been performed (S1660), and amvpMerge prediction based on the motion information of the selected first prediction candidate and the motion information of the second prediction candidate may be performed (S1670).

Step S1650 (candidate reordering process) of FIG. 16 may correspond to steps S1540 to S1570 of FIG. 15, and a repeated description will be omitted.

According to the present embodiment described with reference to FIG. 15 and FIG. 16, amvpMerge prediction may be performed even when reordering of merge candidates is not enabled, so the efficiency of image compression can be improved.

Embodiment 3

According to an embodiment of the present disclosure, motion compensation information of an amvpMerge candidate may be signaled based on information (flag) controlling DMVR. The information controlling the DMVR may be signaled at any level (e.g., SPS, PPS, PH, SH, etc.) of a higher level of a block. Specifically, a method of signaling motion compensation information of an amvpMerge candidate when the value of a flag controlling the DMVR is 0 (i.e., DMVR is not enabled) will be described.

In amvpMerge prediction, if a current slice enables DMVR, two AMVP candidates may be constructed to derive motion information in an amvp prediction direction of the amvpMerge mode. In addition, an MVP index with a value of 0 or 1 may be signaled in a bitstream to determine which candidate is selected. In addition, MVD may not be signaled regardless of the MVP index value.

Meanwhile, if the current slice does not enable DMVR, three AMVP prediction candidates may be constructed to derive motion information in the amvp prediction direction of the amvpMerge mode. At this time, a first prediction candidate (MVP index 0) may have the motion information of the first amvp prediction candidate in the amvp list constructed in the conventional manner, and a second prediction candidate (MVP index 1) may have the motion information of the second amvp prediction candidate in the amvp list constructed in the conventional manner. In addition, a third prediction candidate (MVP index 2) may have motion information based on the MVD signaled separately from the motion information of the first amvp prediction candidate in the amvp list constructed in the conventional manner. That is, the first and second prediction candidates have the motion information of the first and second candidates in the AMVP list without the MVD, and the MVD may be signaled only for the third prediction candidate.

According to another embodiment of the present disclosure, if the current slice does not enable DMVR, three MVP prediction candidates are constructed to derive motion information in the amvp prediction direction, and MVD may always be signaled for all AMVP prediction candidates, regardless of the MVP index value. Although the embodiment according to the present disclosure has been described as constructing three MVP candidates to derive motion information in the amvp prediction direction if the current slice does not enable DMVR, N MVP candidates may be constructed. Here, the value of N may be a natural number greater than or equal to 1.

In the present disclosure, the mvp mode may be referred to as amvp mode, and when the mvp mode is applied, an mvp candidate list may be generated using a motion vector of a reconstructed spatial neighboring block and/or a motion vector corresponding to a temporal neighboring block (or col block). That is, the motion vector of the reconstructed spatial neighboring block and/or the motion vector corresponding to the temporal neighboring block may be used as motion vector predictor candidates. If the number of amvp candidates derived from the spatial neighboring blocks (left blocks and top blocks) and the temporal neighboring blocks (col blocks) of the current block is less than a predetermined number, a history-based candidate based on motion information of previously encoded/decoded blocks of the current block may be included in the mvp candidate list as an amvp candidate. However, if the number of mvp candidates is less than a predetermined number, a zero vector may be included in the mvp candidate list. The prediction information (information about prediction) received from the decoder may include selection information (i.e., MVP flag or MVP index) indicating an optimal motion vector predictor candidate selected from among the motion vector predictor candidates included in the MVP candidate list. At this time, the inter prediction unit 260 may select a motion vector predictor of the current block from among the motion vector predictor candidates included in the motion vector candidate list by using the selection information. In addition, the inter prediction unit 260 may obtain an MVD included in the prediction information, and may derive an MV of the current block by adding the MVD and the MVP.

As described above, according to the present embodiment, if the current slice does not enable DMVR, three amvp candidates in the amvp prediction direction may be constructed. Accordingly, an mvp list may be constructed using the three available amvp candidates in the order of a spatial candidate derived from spatial neighboring blocks of the current block, a temporal candidate derived from temporal neighboring blocks, a history-based candidate, and a zero vector. However, the method of constructing the mvp list according to the present disclosure is not limited thereto, and may be constructed using at least one of a motion vector of a spatial neighboring block, a motion vector of a reconstructed temporal neighboring block, a history-based motion vector, or a zero vector.

As mentioned above, if DMVR is not enabled, MVD may be transmitted for each of the (three) amvp candidates, and if DMVR is enabled, MVD may not be transmitted. The syntax structure for signaling this is shown in Table 2 below for an example.

TABLE 2

```
if(amvpMergeMode[ 1 - RefPic0 ][ x0 ][ y0 ]) {
if(!enableDMVD) {
mvp_l0_idx
mvd_coding(RefPic0, x0, y0)}
else
mvp_l0_flag
ref_idx_l0
if(amvpMergeMode[ 1 - RefPic1 ][ x0 ][ y0 ]
if(!enableDMVD) {
mvp_l1_idx
mvd_coding(RefPic1, x0, y0)}
else
mvp_l1_flag
ref_idx_l1
```

As shown in Table 2 above, in the amvpMerge mode of the present disclosure, if DMVR is not enabled (if(!enabledDMVD)), information for selecting an amvp candidate (e.g., mvp_10_idx) and MVD (e.g., mvd_coding) may be signaled. At this time, since the mvp list is composed of three amvp candidates, mvp_10_idx having a value of 0 to 2 may be signaled. In addition, if DMVR is enabled (if (enabledDMVD)), information for selecting an amvp candidate (e.g., mvp_10_flag) is signaled, and MVD may not be signaled. At this time, since the mvp list is composed of two amvp candidates, mvp_10_flag having a value of 0 to 1 may be signaled.

According to the present embodiment, when DMVR is not enabled, the number of amvp candidates is set to 3, and by signaling MVD for all candidates, the accuracy of the motion vector can be improved, and thus the encoding efficiency can be increased.

Although the present embodiment has been described as configuring the number of amvp candidates to 3 when DMVR is not enabled, N amvp candidates may be constructed. Here, the value of N may be a natural number greater than or equal to 1.

Although various embodiments according to the present disclosure have been described as being performed in the inter prediction unit 260 of the image decoding apparatus, it is obvious to those skilled in the art that the corresponding operation or the same operation may also be performed in the inter prediction unit 180 of the image encoding apparatus.

While the exemplary methods of the present disclosure described above are represented as a series of operations for clarity of description, it is not intended to limit the order in which the steps are performed, and the steps may be performed simultaneously or in different order as necessary. In order to implement the method according to the present disclosure, the described steps may further include other steps, may include remaining steps except for some of the steps, or may include other additional steps except for some steps.

In the present disclosure, the image encoding apparatus or the image decoding apparatus that performs a predetermined operation (step) may perform an operation (step) of confirming an execution condition or situation of the corresponding operation (step). For example, if it is described that predetermined operation is performed when a predetermined condition is satisfied, the image encoding apparatus or the image decoding apparatus may perform the predetermined operation after determining whether the predetermined condition is satisfied.

The various embodiments of the present disclosure are not a list of all possible combinations and are intended to describe representative aspects of the present disclosure, and the matters described in the various embodiments may be applied independently or in combination of two or more.

Various embodiments of the present disclosure may be implemented in hardware, firmware, software, or a combination thereof. In the case of implementing the present disclosure by hardware, the present disclosure can be implemented with application specific integrated circuits (ASICs), Digital signal processors (DSPs), digital signal processing devices (DSPDs), programmable logic devices (PLDs), field programmable gate arrays (FPGAs), general processors, controllers, microcontrollers, microprocessors, etc.

In addition, the image decoding apparatus and the image encoding apparatus, to which the embodiments of the present disclosure are applied, may be included in a multimedia broadcasting transmission and reception device, a mobile communication terminal, a home cinema video device, a digital cinema video device, a surveillance camera, a video chat device, a real time communication device such as video communication, a mobile streaming device, a storage medium, a camcorder, a video on demand (VOD) service providing device, an OTT video (over the top video) device, an Internet streaming service providing device, a three-dimensional (3D) video device, a video telephony video device, a medical video device, and the like, and may be used to process video signals or data signals. For example, the OTT video devices may include a game console, a blu-ray player, an Internet access TV, a home theater system, a smartphone, a tablet PC, a digital video recorder (DVR), or the like.

FIG. 17 is a view showing a content streaming system, to which an embodiment of the present disclosure is applicable.

As shown in FIG. 17, the content streaming system, to which the embodiment of the present disclosure is applied, may largely include an encoding server, a streaming server, a web server, a media storage, a user device, and a multimedia input device.

The encoding server compresses content input from multimedia input devices such as a smartphone, a camera, a camcorder, etc. into digital data to generate a bitstream and transmits the bitstream to the streaming server. As another example, when the multimedia input devices such as smartphones, cameras, camcorders, etc. directly generate a bitstream, the encoding server may be omitted.

The bitstream may be generated by an image encoding method or an image encoding apparatus, to which the embodiment of the present disclosure is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server may deliver it to a streaming server, and the streaming server may transmit multimedia data to the user. In this case, the content streaming system may include a separate control server. In this case, the control server serves to control a command/response between devices in the content streaming system.

The streaming server may receive content from a media storage and/or an encoding server. For example, when the content are received from the encoding server, the content may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (e.g., smartwatches, smart glasses, head mounted displays), digital TVs, desktops computer, digital signage, and the like.

Each server in the content streaming system may be operated as a distributed server, in which case data received from each server may be distributed.

The scope of the disclosure includes software or machine-executable commands (e.g., an operating system, an application, firmware, a program, etc.) for enabling operations according to the methods of various embodiments to be executed on an apparatus or a computer, a non-transitory computer-readable medium having such software or commands stored thereon and executable on the apparatus or the computer.

INDUSTRIAL APPLICABILITY

The embodiments of the present disclosure may be used to encode or decode an image.

The invention claimed is:

1. An image decoding method performed by an image decoding apparatus, the image decoding method comprising:

selecting a first prediction candidate for a first prediction direction of a current block from a first prediction candidate list;

selecting a second prediction candidate for a second prediction direction of the current block from a second prediction candidate list; and generating a prediction block for the current block based on the first prediction candidate and the second prediction candidate, wherein the first prediction candidate is an advanced motion vector prediction (AMVP) candidate and the second prediction candidate is a merge candidate.

2. The image decoding method of claim 1, comprising:

obtaining decoder-side motion vector refinement (DMVR) enabled information indicating whether DMVR is enabled; and adaptively performing refinement of the first prediction candidate and the second prediction candidate based on the DMVR enabled information.

3. The image decoding method of claim 2, wherein motion information refinement is skipped for the first prediction candidate and the second prediction candidate based on the DMVR enabled information indicating that DMVR is not enabled, and wherein the generating the prediction block for the current block is performed based on the first prediction candidate and the second prediction candidate for which the motion information refinement has not been performed.

4. The image decoding method of claim 2, wherein motion information refinement is performed for the first prediction candidate and the second prediction candidate based on the DMVR enabled information indicating that DMVR is enabled, and wherein the generating the prediction block for the current block is performed based on the first prediction candidate and the second prediction candidate for which the motion information refinement has been performed.

5. The image decoding method of claim 1, wherein the selecting the second prediction candidate comprises adaptively performing reordering of the second prediction candidate based on reordering enabled information indicating whether reordering of the second prediction candidate included in the second prediction candidate list is enabled.

6. The image decoding method of claim 5, wherein reordering of the second prediction candidate included in the second prediction candidate list is skipped based on the reordering enabled information indicating that reordering is not enabled, and wherein selection of the second prediction candidate is performed based on the second prediction candidate list for which reordering has not been performed.

7. The image decoding method of claim 5, wherein reordering of the second prediction candidate included in the second prediction candidate list is performed based on the reordering enabled information indicating that reordering is enabled, and wherein selection of the second prediction candidate is performed based on the second prediction candidate list for which reordering has been performed.

8. The image decoding method of claim 5, wherein the reordering is performed based on a bilateral matching cost between the first prediction candidate and the second prediction candidate.

9. The image decoding method of claim 1, wherein construction of the first prediction candidate list or derivation of first prediction motion information of the current block based on the first prediction candidate is adaptively performed based on whether DMVR is enabled.

10. The image decoding method of claim 9, wherein the first prediction candidate list includes N first prediction candidates based on the DMVR being not enabled, and the first prediction motion information of the current block is derived based on the first prediction candidate and a motion vector difference value obtained from a bitstream, and wherein the motion vector difference value is signaled for each of the N first prediction candidates, where N is a natural number greater than or equal to 1.

11. An image encoding method performed by an image encoding apparatus, the image encoding method comprising:

determining a first prediction candidate for a first prediction direction of a current block from a first prediction candidate list;

determining a second prediction candidate for a second prediction direction of the current block from a second prediction candidate list; and generating a prediction block for the current block based on the first prediction candidate and the second prediction candidate, wherein the first prediction candidate is an advanced motion vector prediction (AMVP) candidate and the second prediction candidate is a merge candidate.

12. A method of transmitting a bitstream generated by an image encoding method, the image encoding method comprising:

determining a first prediction candidate for a first prediction direction of a current block from a first prediction candidate list;

determining a second prediction candidate for a second prediction direction of the current block from a second prediction candidate list; and generating a prediction block for the current block based on the first prediction candidate and the second prediction candidate, wherein the first prediction candidate is an advanced motion vector prediction (AMVP) candidate and the second prediction candidate is a merge candidate.

* * * * *